United States Patent
Ishikawa et al.

(10) Patent No.: US 6,505,265 B1
(45) Date of Patent: Jan. 7, 2003

(54) BUS ARBITRATION SYSTEM WITH CHANGING ARBITRATION RULES

(75) Inventors: Osamu Ishikawa, Tokyo (JP); Toshikazu Ito, Tokyo (JP); Satoshi Yamamoto, Tokyo (JP); Yoshikazu Endo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/313,279

(22) Filed: May 18, 1999

(30) Foreign Application Priority Data

May 20, 1998 (JP) .......................................... 10-155227
Nov. 11, 1998 (JP) .......................................... 10-320098

(51) Int. Cl.[7] ........................ G06F 13/36; G06F 13/362

(52) U.S. Cl. ........................ 710/113; 710/107; 710/36; 710/241

(58) Field of Search ................................. 710/107, 113, 710/240, 241, 36, 49, 110, 116

(56) References Cited

U.S. PATENT DOCUMENTS

| 5,253,347 | A | * | 10/1993 | Bagnoli et al. | 710/113 |
| 5,471,590 | A | * | 11/1995 | Melo et al. | 340/825.5 |
| 5,544,332 | A | * | 8/1996 | Chen | 700/14 |
| 5,621,897 | A | * | 4/1997 | Boury et al. | 710/113 |
| 5,796,968 | A | * | 8/1998 | Takamiya | 710/113 |
| 5,797,020 | A | * | 8/1998 | Bonella et al. | 710/107 |

* cited by examiner

*Primary Examiner*—Xuan M. Thai
(74) *Attorney, Agent, or Firm*—Rabin & Berdo, P.C.

(57) ABSTRACT

A bus arbitration system uses different arbitration rules at different times, by periodically changing the priority order of the bus masters; by masking further bus requests from a particular bus master for a certain interval each time that bus master is granted the use of the bus; by masking requests from bus masters other than a central processing unit for certain intervals while the central processing unit is processing an interrupt; by raising the priority of a particular bus master if a bus request from that bus master remains unacknowledged for a certain interval; or by ignoring bus requests from the central processing unit while another bus master is performing a certain process.

16 Claims, 39 Drawing Sheets

FIG. 3

| COUNT | PRIORITY ORDER | CPU P[7:6] | DMAC 2 P[5:4] | DMAC 3 P[3:2] | DMAC 4 P[1:0] |
|---|---|---|---|---|---|
| 0 | A | 0 | 3 | 2 | 1 |
| 1 | B | 1 | 0 | 3 | 2 |
| 2 | C | 2 | 1 | 0 | 3 |
| 3 | D | 3 | 2 | 1 | 0 |

FIG. 4

| CPUREQP | DMAREQ2P | DMAREQ3P | DMAREQ4P | BUSREQP |
|---|---|---|---|---|
| 1 | * | * | * | 1 |
| * | 1 | * | * | 1 |
| * | * | 1 | * | 1 |
| * | * | * | 1 | 1 |
| 0 | 0 | 0 | 0 | 0 |

* : DON'T CARE

FIG. 5

| NO | ARBTIMP | CPUREQP | DMAREQ2P | DMAREQ3P | DMAREQ4P | P[7:6] | P[5:4] | P[3:2] | P[1:0] | SEL |
|---|---|---|---|---|---|---|---|---|---|---|
| 1 | 1 | 1 | 0 | 0 | 0 | * | * | * | * | 00 |
| 2 | 1 | 0 | 1 | 0 | 0 | * | * | * | * | 01 |
| 3 | 1 | 0 | 0 | 1 | 0 | * | * | * | * | 10 |
| 4 | 1 | 0 | 0 | 0 | 1 | * | * | * | * | 11 |
| 5 | 1 | 1 | 1 | 0 | 0 | P[7:6]≦P[5:4] | * | * | * | 00 |
| 6 | 1 | 1 | 1 | 0 | 0 | P[7:6]>P[5:4] | * | * | * | 01 |
| 7 | 1 | 0 | 1 | 1 | 0 | * | P[5:4]≦P[3:2] | * | * | 01 |
| 8 | 1 | 0 | 1 | 1 | 0 | * | P[5:4]>P[3:2] | * | * | 10 |
| 9 | 1 | 0 | 0 | 1 | 1 | * | * | P[3:2]≦P[1:0] | * | 10 |
| 10 | 1 | 0 | 0 | 1 | 1 | * | * | P[3:2]>P[1:0] | * | 11 |
| 11 | 1 | 1 | 0 | 1 | 0 | P[7:6]≦ | * | P[3:2] | * | 00 |
| 12 | 1 | 1 | 0 | 1 | 0 | P[7:6]> | * | P[3:2] | * | 10 |
| 13 | 1 | 1 | 0 | 0 | 1 | P[7:6]≦ | * | * | P[1:0] | 00 |
| 14 | 1 | 1 | 0 | 0 | 1 | P[7:6]> | * | * | P[1:0] | 11 |
| 15 | 1 | 0 | 1 | 0 | 1 | * | P[5:4]≦ | * | P[1:0] | 01 |
| 16 | 1 | 0 | 1 | 0 | 1 | * | P[5:4]> | * | P[1:0] | 11 |
| 17 | 1 | 1 | 1 | 1 | 0 | P[7:6]≦P[5:4]orP[3:2] | * | * | * | 00 |
| 18 | 1 | 1 | 1 | 1 | 0 | P[7:6]>P[5:4]≦P[3:2] | * | * | * | 01 |
| 19 | 1 | 1 | 1 | 1 | 0 | P[7:6]orP[5:4]>P[3:2] | * | * | * | 10 |
| 20 | 1 | 1 | 1 | 0 | 1 | P[7:6]≦P[5:4] | * | orP[1:0] | | 00 |
| 21 | 1 | 1 | 1 | 0 | 1 | P[7:6]>P[5:4] | * | ≦P[1:0] | | 01 |
| 22 | 1 | 1 | 1 | 0 | 1 | P[7:6]orP[5:4] | * | >P[1:0] | | 10 |
| 23 | 1 | 1 | 0 | 1 | 1 | P[7:6]≦ | * | P[3:2]orP[1:0] | | 00 |
| 24 | 1 | 1 | 0 | 1 | 1 | P[7:6]> | * | P[3:2]≦P[1:0] | | 10 |
| 25 | 1 | 1 | 0 | 1 | 1 | P[7:6]or | * | P[3:2]>P[1:0] | | 11 |
| 26 | 1 | 0 | 1 | 1 | 1 | * | P[5:4]≦P[3:2]orP[1:0] | | | 00 |
| 27 | 1 | 0 | 1 | 1 | 1 | * | P[5:4]>P[3:2]≦P[1:0] | | | 10 |
| 28 | 1 | 0 | 1 | 1 | 1 | * | P[5:4]orP[3:2]>P[1:0] | | | 11 |
| 29 | 1 | 1 | 1 | 1 | 1 | P[7:6]≦P[5:4]orP[3:2]orP[1:0] | | | | 00 |
| 30 | 1 | 1 | 1 | 1 | 1 | P[7:6]>P[5:4]≦P[3:2]orP[1:0] | | | | 01 |
| 31 | 1 | 1 | 1 | 1 | 1 | P[7:6]orP[5:4]>P[3:2]≦P[1:0] | | | | 10 |
| 32 | 1 | 1 | 1 | 1 | 1 | P[7:6]orP[5:4]orP[3:2]>P[1:0] | | | | 11 |
| 33 | 0 | * | * | * | * | * | * | * | * | SEL(T-1) |

*: DON'T CARE

FIG. 6

| SEL | OUTPUT |
|---|---|
| 00 | CPUACKP |
| 01 | DMACK2P |
| 10 | DMACK3P |
| 11 | DMACK4P |

FIG. 7

| SEL | OUTPUT |
|---|---|
| 00 | CPUADRP |
| 01 | DMADR2P |
| 10 | DMADR3P |
| 11 | DMADR4P |

FIG. 8

| SEL | OUTPUT |
|---|---|
| 00 | CPUWTDTP |
| 01 | DMAWTDT2P |
| 10 | DMAWTDT3P |
| 11 | DMAWTDT4P |

FIG. 13

| COMBI-NATION | COUNT | | | |
|---|---|---|---|---|
| | 0 | 1 | 2 | 3 |
| 0 | A | A | A | A |
| 1 | A | B | C | D |
| 2 | A | B | A | B |
| 3 | E | F | G | H |
| 4 | E | F | E | F |

FIG. 15

| CPU | CPU | DMAC 2 | DMAC 3 | DMAC 4 |
|---|---|---|---|---|
| PRIORITY | 4 | 1 | 2 | 3 |

| UFLAGP | CPU | DMAC 2 | DMAC 3 | DMAC 4 |
|--------|-----|--------|--------|--------|
| 0<br>1 | 3<br>4 | 1<br>2 | 2<br>3 | 4<br>1 |

BUS ARBITRATION SYSTEM WITH CHANGING ARBITRATION RULES

BACKGROUND OF THE INVENTION

The present invention relates to a bus arbitration system for arbitrating among bus requests from a plurality of bus masters in a computing device.

Many computing devices have a bus that is shared by a plurality of bus masters, typically including at least a central processing unit and a direct memory access controller. Each bus master can request the right to use the bus by sending a request signal to a bus controller. A known method of arbitrating among competing requests, employed in many conventional bus controllers, is to assign a priority order to the bus masters and grant the right to use the bus to the highest-priority bus master requesting it.

A problem with this conventional method is that it is unfair. A high-priority bus master can monopolize the bus by issuing bus requests continuously, forcing a lower-priority bus master to wait for a long time before receiving the use of the bus.

A further problem is that this method is inflexible. In many computing systems, the processes performed by the different bus masters have different levels of urgency at different times, but the conventional method employs the same priority order at all times.

SUMMARY OF THE INVENTION

It is accordingly an object of the present invention to arbitrate fairly among competing requests for the use of a shared bus.

Another object is to arbitrate flexibly among competing requests for the use of a shared bus.

The invention pertains to a bus arbitration system in which a plurality of bus masters request the use of a shared bus. All aspects of the invention provide predetermined rules for arbitrating among competing requests, and change these rules at certain times, or under certain conditions.

In one aspect of the invention, a plurality of priority orders are stored in a priority-order memory. Each stored priority order assigns relative priorities to the bus masters. A priority-order selector generates a selection signal that periodically selects different stored priority orders. A bus arbiter arbitrates among competing requests from the bus masters according to the priority order currently selected by the selection signal.

This bus arbitration system can be made fair by cyclically rotating the priorities of the bus masters. It can be made flexible by storing different combinations of priority orders in the priority-order memory, responsive to different system operating conditions.

In another aspect of the invention, a request signal masking unit masks requests from a particular bus master for a certain interval each time that bus master is granted the use of the shared bus. This bus arbitration system is flexible in that the length of the interval is programmable.

In yet another aspect of the invention, one of the bus masters is a central processing unit that receives an interrupt signal. While the central processing unit is processing an interrupt, requests from other bus masters are masked for an interval of predetermined length. Preferably, the masking starts each time the use of the shared bus is granted to another bus master while the central processing unit is processing the interrupt. This bus arbitration system is also flexible in that the length of the interval is programmable.

In still another aspect of the invention, arbitration among requests for the use of the shared bus is carried out according to a priority order assigning a priority to each bus master, and requests from a particular bus master are monitored. If a request from this bus master is left unacknowledged for a certain interval, the priority of this bus master is raised. This bus arbitration system is also flexible in that the length of the interval is programmable.

In a further aspect of the invention, one of the bus masters is a central processing unit, and another one of the bus masters carries out a certain operation requiring use of the shared bus. While this operation is being carried out, bus requests from the central processing unit are ignored. The ignoring of requests may be temporarily suspended while the central processing unit is processing an interrupt. This bus arbitration system is flexible because it alters the bus arbitration rules according to special circumstances.

BRIEF DESCRIPTION OF THE DRAWINGS

In the attached drawings:

FIG. 3 illustrates the priority orders stored in the priority-order memory in FIG. 2;

FIG. 4 is a truth table of the BUSREQP signal in FIG. 2;

FIG. 5 illustrates the rules by which the bus arbiter in FIG. 2 sets the value of the SEL signal;

FIG. 6 illustrates the operation of the decoder in FIG. 2;

FIG. 7 illustrates the operation of the address selector in FIG. 2;

FIG. 8 illustrates the operation of the data selector in FIG. 2;

FIG. 13 shows an example of different combinations of priority orders employed in the third embodiment;

FIG. 15 indicates the priority order followed by the bus controller in the fourth embodiment;

DETAILED DESCRIPTION OF THE INVENTION

Figure 1:
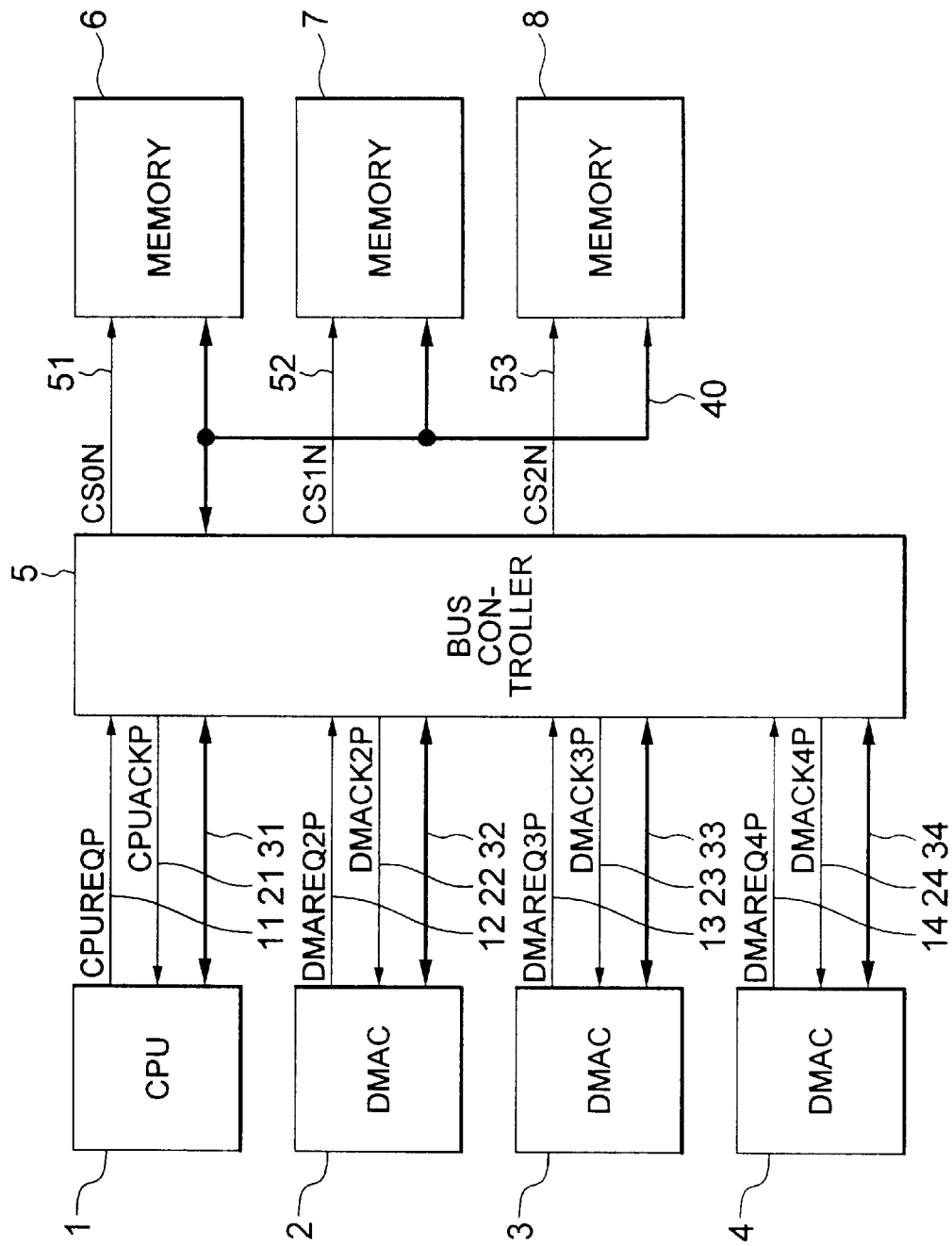
FIG. 1 is a block diagram of a bus arbitration system illustrating a first embodiment of the invention.

Embodiments of the invention will be described with reference to the attached drawings, in which like parts are indicated by like reference characters. Signal names will generally end with P or N to indicate positive or negative logic. For signals ending in P, the '1' state is the asserted state, and the '0' state is the negated state. For signals ending in N, the '0' state is the asserted state, and the '1' state is the negated state.

FIG. 1 is a block diagram illustrating a bus arbitration system according to a first embodiment. This system arbitrates among bus requests from four bus masters: a central processing unit (CPU) 1 and three direct memory access controllers (DMACs) 2, 3, 4. Arbitration is carried out by a bus controller 5, which is coupled to the bus masters and to three memory devices or memory chips 6, 7, 8.

The CPU 1 and the three DMACs 2, 3, 4 communicate with the bus controller 5 over respective request signal lines 11, 12, 13, 14, acknowledge signal lines 21, 22, 23, 24, and buses 31, 32, 33, 34. The bus controller 5 communicates with the memory devices 6, 7, 8 over a shared bus 40 and over individual chip select signal lines 51, 52, 53, which carry chip select signals CS01, CS1N, CS2N.

The CPU 1 and DMACs 2, 3, 4 send respective request signals CPUREQP, DMAREQ2P, DMAREQ3P, DMAREQ4P to the bus controller 5 on the request signal lines 11, 12, 13, 14. The bus controller 5 returns respective acknowledge signals CPUACKP, DMACK2P, DMACK3P, DMACK4P on the acknowledge signal lines 21, 22, 23, 24. When a bus master is granted the use of the bus, the bus controller 5 notifies the bus master by asserting the corresponding acknowledge signal, and carries out the access requested by the bus master.

Figure 2:
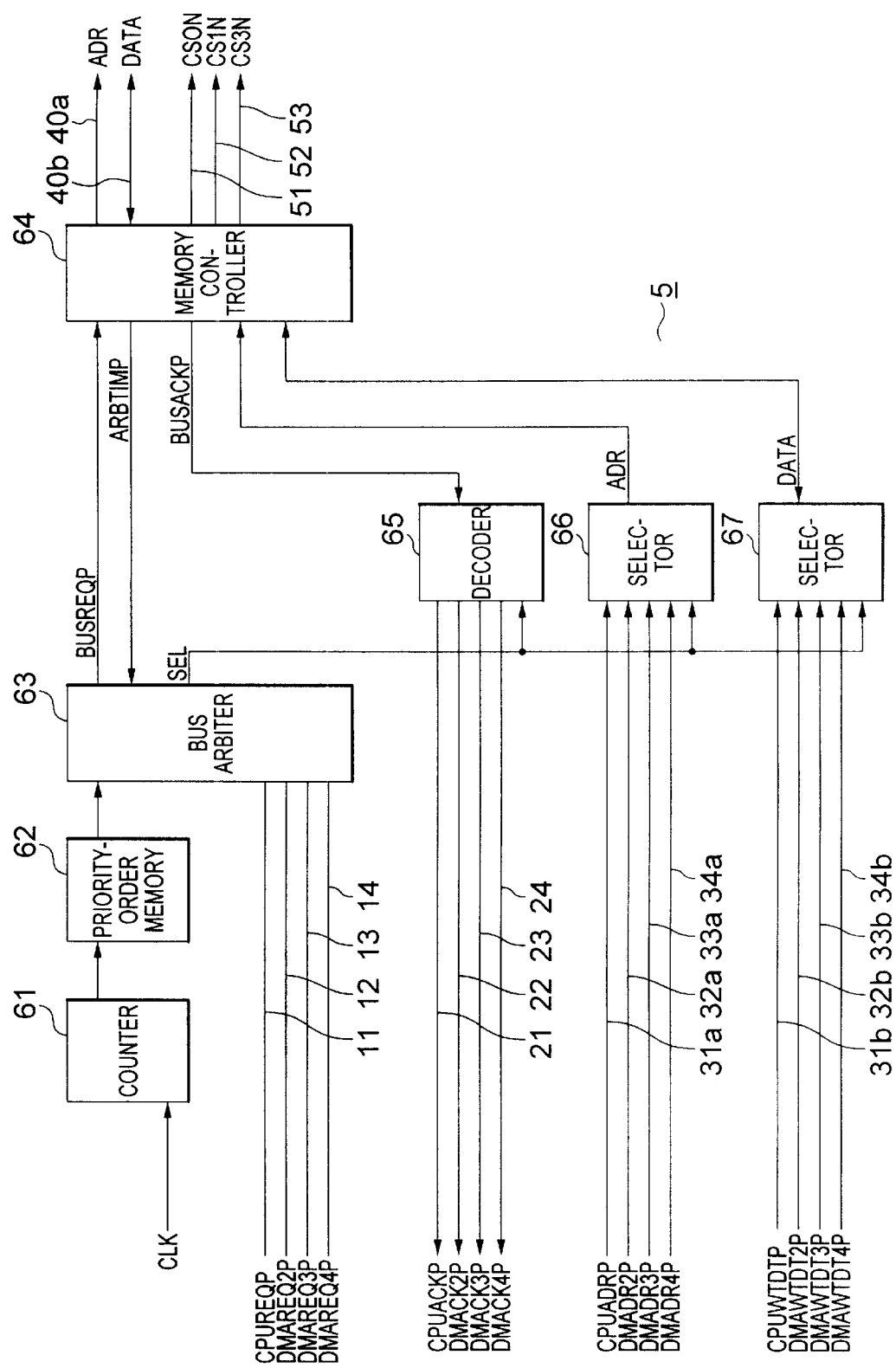
FIG. 2 is a block diagram of the bus controller in the first embodiment.

Referring to FIG. 2, the bus controller 5 comprises a counter 61, a priority-order memory 62, a bus arbiter 63, a memory controller 64, a decoder 65, an address selector 66, and a data selector 67.

The counter 61 is a two-bit counter that receives a system clock signal CLK and cyclically outputs count values of zero, one, two, and three in synchronization with rising clock edges, incrementing once per clock cycle. The counter 61 functions as a priority-order selector.

The priority-order memory 62 stores four bytes of priority information, each byte assigning a different priority order to the CPU 1 and DMACs 2, 3, 4 for use of the shared bus 40. The four priority orders are selected by the four count values, which the priority-order memory 62 receives as a priority selection signal from the counter 61. Specifically, the priority-order memory 62 stores a priority order A selected by the count value zero, a priority order B selected by the count value one, a priority order C selected by the count value two, and a priority order D selected by the count value three. The priority-order memory 62 supplies the selected priority order to the bus arbiter 63.

Referring to FIG. 3, in the byte of information P[7:0] representing each priority order, the two most significant bits P[7:6] indicate the priority of the CPU 1, the next two bits P[5:4] indicate the priority of DMAC 2, the next two bits P[3:2] indicate the priority of DMAC 3, and the two least significant bits P[1:0] indicate the priority of DMAC 4. Smaller two-bit values indicate higher priorities: '00' (zero) indicates the highest priority, and '11' (three) the lowest priority.

In priority order A, the CPU 1 has the highest priority (zero), followed by DMAC 4, DMAC 3, and DMAC 2 in that order. In priority order B, DMAC 2 has the highest priority, followed by the CPU 1, DMAC 4, and DMAC 3. In priority order C, DMAC 3 has the highest priority, followed by DMAC 2, the CPU 1, and DMAC 4. In priority order D, DMAC 4 has the highest priority, followed by DMAC 3, DMAC 2, and the CPU 1. The four priority orders are cyclically symmetric.

The invention is not limited to a set of priority orders of the cyclically symmetric type shown in FIG. 3. The priority-order memory 62 may store as few as two different priority orders. One or more of the bus masters may have the same priority in all of the priority orders. Furthermore, the counter 61 does not have to increment at every system clock cycle, but can increment once every N clock cycles, where N is an arbitrary positive integer.

Referring again to FIG. 2, the bus arbiter 63 receives the request signals CPUREQP, DMAREQ2P, DMAREQ3P, DMAREQ4P from the bus masters, sends a request signal BUSREQP to the memory controller 64, receives an arbitration timing signal ARBTIMP from the memory controller, and sends the decoder 65 and selectors 66, 67 a select signal SEL indicating a selected bus master. The select signal SEL is a two-bit signal, '00' indicating the CPU 1, '01' indicating DMAC 2, '10' indicating DMAC 3, and '11' indicating DMAC 4. The bus arbiter 63 comprises arithmetic and logic circuits that generate BUSREQP and SEL as explained below.

Referring to FIG. 4, the bus arbiter 63 asserts the request signal BUSREQP when any of the four input request signals CPUREQP, DMAREQ2P, DMAREQ3P, DMAREQ4P is asserted, and negates BUSREQP when all of the input request signals CPUREQP, DMAREQ2P, DMAREQ3P, DMAREQ4P are negated.

When the arbitration timing signal ARBTIMP is asserted, the bus arbiter 63 performs bus arbitration by referring to the priority order P[7:0] supplied by the priority-order memory 62, comparing the priorities of the bus masters currently asserting their request signals, selecting the bus master with the highest priority, and setting the select signal SEL to indicate that bus master.

FIG. 5 indicates the internal rules by which the bus arbiter 63 generates the select signal SEL. Rows one to thirty-two indicate the value to which SEL is set during a system clock cycle in which the arbitration timing signal ARBTIMP is asserted. Row thirty-three indicates that when ARBTIMP is negated, SEL retains the value it had in the preceding clock cycle.

As shown in rows one to four, when only one of the four request signals received by the bus arbiter 63 is asserted, SEL is set to indicate the corresponding bus master.

When just two of the four request signals are asserted simultaneously, the bus arbiter 63 compares the corresponding bits of the priority order P[7:0] to determine the value of SEL. For example, when CPUREQP and DMAREQ2P are asserted simultaneously, the bus arbiter 63 compares P[7:6] with P[5:4]. If P[7:6] is equal to or less than P[5:4], then the CPU 1 is selected and SEL is set to '00' (row five). If P[7:6] is greater than P[5:4], then DMAC 2 is selected and SEL is set to '01' (row six). Rows seven to sixteen indicate the comparisons made for other pairs of requests.

Rows seventeen to twenty-eight indicate the arbitration rules when there are three simultaneous requests. The notation 'P[7:6]≦P[5:4] or P[3:2]' in row seventeen, for example, means that P[7:6] is equal to or less than P[5:4] and P[7:6] is also equal to or less than P[3:2]. When this condition is true, SEL is set to '00.' Rows twenty-nine to thirty-two give the rules for arbitrating among four simultaneous requests, using similar notation.

The bus arbiter 63 is not restricted to the rules shown in FIG. 5. For example, the bus arbiter 63 can be adapted to retain the values of the input request signals instead of retaining the value of the select signal SEL. The bus arbiter 63 can also be adapted to perform arbitration when BUSREQP is asserted and no acknowledge signal is asserted, and retain the SEL value when an acknowledge signal is asserted, as will be shown in several later embodiments.

Referring again to FIG. 2, the memory controller 64 receives address signals (ADR) from the address selector 66 and carries out requested memory access operations, exchanging data with a bus master through the data selector 67. In performing a memory access operation, the memory controller 64 selects one of the memory devices 6, 7, 8 according to certain bits of the received address information, and asserts the corresponding chip select signal CS0N, CS1N, or CS2N. The memory controller 64 places other bits of the address information on an address bus 40a that constitutes one part of the shared bus 40. For write access, the memory controller places write data received from the data selector 67 on a data bus 40b that constitutes another part of the shared bus 40b.

When the memory controller 64 is not performing an access operation, if the bus request signal BUSREQP received from the bus arbiter 63 is asserted, the memory controller 64 responds by asserting the arbitration timing signal ARBTIMP for one system clock cycle to let the bus arbiter 63 perform bus arbitration, then negates ARBTIMP, asserts an acknowledge signal BUSACKP, and begins performing a new access operation requested by the bus master selected by the bus arbiter 63. When the access operation ends, the memory controller negates the acknowledge signal BUSACKP.

The acknowledge signal BUSACKP is received by the decoder 65. The decoder 65 decodes the select signal SEL and acknowledge signal BUSACKP, thereby routing the acknowledge signal BUSACKP to the CPU 1, DMAC 2, DMAC 3, or DMAC 4, as indicated in FIG. 6. The decoder 65 uses the select signal SEL to select one of the four acknowledge signal lines 21, 22, 23, 24, and places the acknowledge signal BUSACKP on the selected signal line, holding the other acknowledge signal lines in the negated state. Thus when SEL is '00,' BUSACKP becomes CPUACKP; when SEL is '01,' BUSACKP becomes DMACK2P; when SEL is '10,' BUSACKP becomes DMACK3P; and when SEL is '11,' BUSACKP becomes DMACK4P.

Referring again to FIGS. 1 and 2, the bus 31 between the CPU 1 and the bus controller 5 comprises an address bus 31a that carries address signals CPUADRP from the CPU 1 to the bus controller 5, and a data bus 31b that carries data signals between the CPU 1 and the bus controller 5. Similarly, the buses linking the DMACs 2, 3, 4 to the bus controller 5 comprise address buses 32a, 33a, 34a carrying address signals, and data buses 32b, 33b, 34b carrying data signals. FIG. 2 indicates only the write data signals output by the CPU 1 and DMACs 2, 3, 4, but read data signals are also transferred, in the opposite direction.

The address selector 66 selects one of the four address buses 31a, 32a, 33a, 34a according to the select signal SEL, and sends the selected address information CPUADRP, DMADR2P, DMADR3P, or DMADR4P to the memory controller 64. Referring to FIG. 7, selector 66 selects CPUADRP when SEL is '00,' DMADR2P when SEL is '01,' DMADR3P when SEL is '10,' and DMADR4P when SEL is '11.'

The data selector 67 selects one of the four data buses 31b, 32b, 33b, 34b according to the select signal SEL. During write access, selector 67 supplies the selected write data CPUWTDTP, DMAWTDT2P, DMAWTDT3P, or DMAWTDT4P to the memory controller 64. Referring to FIG. 8, selector 67 selects CPUWTDTP when SEL is '00,' DMAWTDT2P when SEL is '01,' DMAWTDT3P when SEL is '10,' and DMAWTDT4P when SEL is '11.'

The operation of the first embodiment will now be described with reference to the timing diagram in FIG. 9, which shows an example of arbitration among simultaneous bus requests from the four bus masters. In this and subsequent timing diagrams, cycles of the system clock CLK are numbered for reference.

Figure 9:
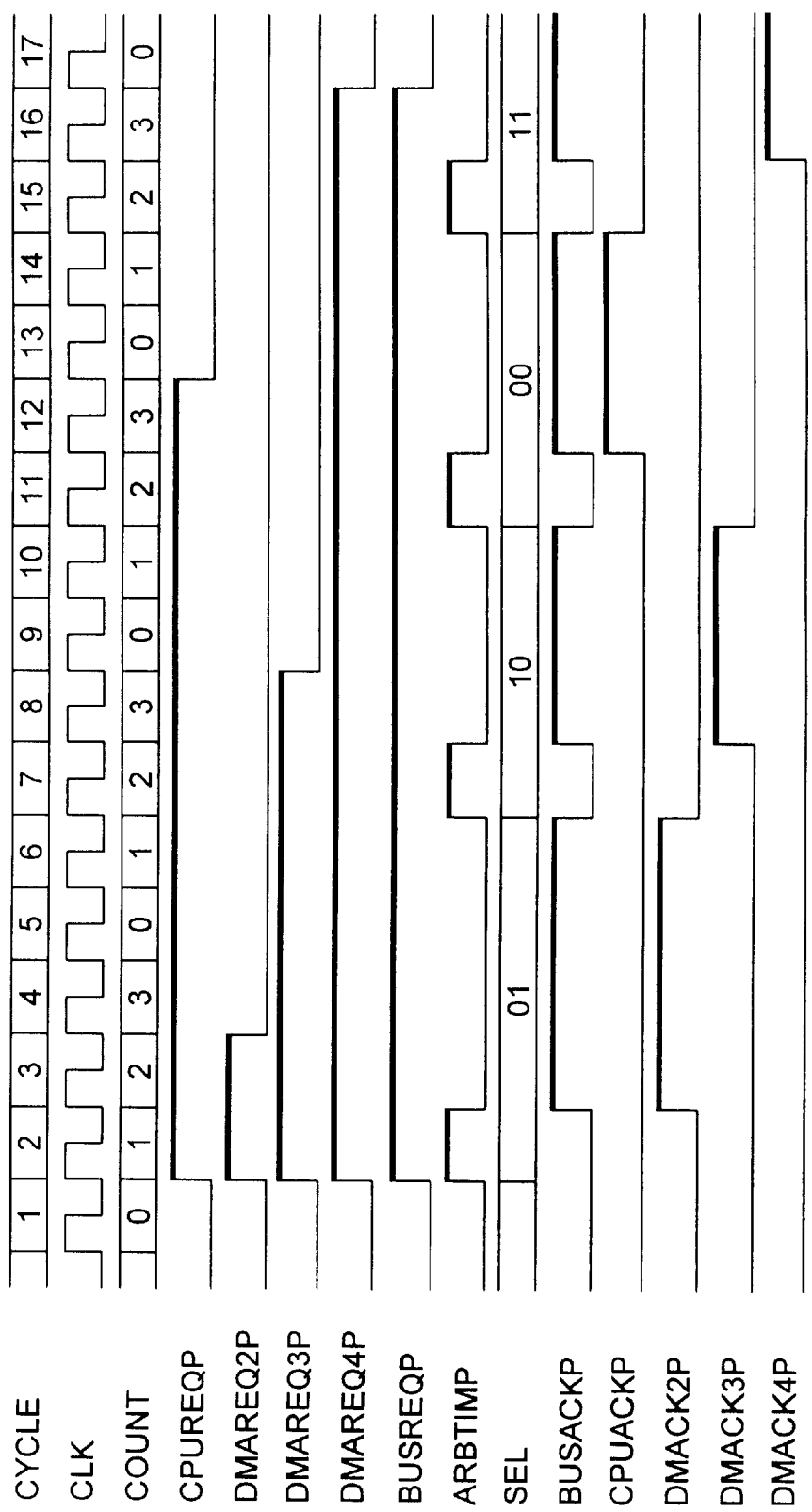
FIG. 9 is a timing diagram illustrating the operation of the first embodiment.

In the example shown in FIG. 9, all request signals and acknowledge signals are initially negated. In the second clock cycle, the CPU 1 and DMACs 2, 3, 4 simultaneously encounter a need to write data to memory, and assert their request signals CPUREQP, DMAREQ2P, DMAREQ3P, DMAREQ4P, causing the bus arbiter 63 to assert its request signal BUSREQP. The memory controller 64 responds to the assertion of BUSREQP by immediately asserting the arbitration timing signal ARBTIMP. The bus arbiter 63 responds to the assertion of ARBTIMP by performing bus arbitration.

As the count value output by the counter 61 in the second clock cycle is one, the priority-order memory 62 supplies the bus arbiter 63 with priority order B. As all four request signals CPUREQP, DMAREQ2P, DMAREQ3P, DMAREQ4P are asserted, the bus arbiter 63 compares the values of all four pairs of bits in priority order B. From FIG. 3,

P[7:6]=1

P[5:4]=0

P[3:2]=3

P[1:0]=2

The condition in row thirty of FIG. 5 is true, so the bus arbiter 63 sets the select signal SEL to '01.' The decoder 65 selects acknowledge signal line 22, selector 66 selects address bus 32a, and selector 67 selects data bus 32b. The address signal DMADR2P and write data signal DMAWTDT2P from DMAC 2 are thereby supplied to the memory controller 64.

In the third clock cycle, the memory controller 64 negates the arbitration timing signal ARBTIMP, causing the bus arbiter 63 to retain the value '01' of the select signal SEL, and asserts the acknowledge signal BUSACKP. As the decoder 65 continues to select acknowledge signal line 22, acknowledge signal DMACK2P is asserted, notifying DMAC 2 that it has been granted the right to use the bus and that the requested access has begun.

The memory controller 64 simultaneously begins access to the memory devices 6, 7, 8 according to the address signal DMADR2P and write data signal DMAWTDT2P received from DMAC 2, placing the appropriate bits of the address signal DMADR2P on the data bus 40a, placing the write data DMAWTDT2P on the data bus 40b, and asserting one of the chip select signals CS0N, CS1N, CS2N, according to other bits of the address signal DMADR2P.

In the fourth clock cycle, DMAC 2 responds to the acknowledge signal DMACK2P by negating the request signal DMAREQ2P. Access to the selected memory device continues in the fifth and sixth clock cycles, ending at the end of the sixth clock cycle.

In the seventh clock cycle, since the memory access operation by DMAC 2 has ended, the memory controller 64 negates the acknowledge signal BUSACKP, thereby also negating the acknowledge signal DMACK2P on the acknowledge signal line 22 selected by the decoder 65. DMAC 2 is thus notified that the requested access has ended.

At the same time, since request signals CPUREQP, DMAREQ3P, DMAREQ4P, and therefore BUSREQP are still asserted, the bus arbiter 63 asserts the arbitration timing signal ARBTIMP to have arbitration performed for the next access. The count value of the counter 61 is now two, so the priority-order memory 62 supplies priority order C to the bus arbiter 63, which compares the values of the pairs of bits corresponding to request signals CPUREQP, DMAREQ3P, and DMAREQ4P. From FIG. 3, these have the following values:

P[7:6]=2

P[3:2]=0

P[1:0]=3

The condition in row twenty-four of FIG. 5 is true, and a select signal SEL with the value '10' is supplied to the decoder 65 and selectors 66, 67. The decoder 65 selects acknowledge signal line 23, selector 66 selects address bus 33a, and selector 67 selects data bus 33b. The address signal DMADR3P and write data DMAWTDT3P from DMAC 3 are supplied to the memory controller 64.

In the eighth clock cycle, the memory controller 64 negates the arbitration timing signal ARBTIMP, causing the bus arbiter 63 to retain the value '10' of the select signal SEL, and asserts the acknowledge signal BUSACKP. As the decoder 65 continues to select acknowledge signal line 23, acknowledge signal DMACK3P is asserted, notifying DMAC 3 that it has been granted the use of the bus and that access has begun.

The memory controller 64 now begins access to the memory devices 6, 7, 8 according to the address signal DMADR3P and data signal DMAWTDT3P received from DMAC 3, asserting one of the chip select signals CS0N, CS1N, CS2N according to certain bits of the address signal DMADR3P.

In the ninth clock cycle, DMAC 3 responds to the acknowledge signal DMACK3P by negating the request signal DMAREQ3P. Access to the selected memory device ends at the end of the tenth clock cycle.

In the eleventh clock cycle, since the memory access operation by DMAC 3 has ended, the memory controller 64 negates the acknowledge signal BUSACKP, thereby also negating the acknowledge signal DMACK3P on the acknowledge signal line 23 selected by the decoder 65, and notifying DMAC 3 that access has ended.

As request signals CPUREQP, DMAREQ4P, and therefore BUSREQP are still asserted, the bus arbiter 63 asserts the arbitration timing signal ARBTIMP for the next access. The count value of the counter 61 is again two, but request signal DMAREQ3P is no longer asserted, so this time, use of the bus is granted to the CPU 1. The access requested by the CPU is carried out in the manner described above, ending at the end of the fourteenth clock cycle.

In the fifteenth clock cycle, only request signal DMAREQ4P is asserted, so DMAC 4 obtains the right to use the bus. The memory access requested by DMAC 4 begins in the sixteenth clock cycle.

As illustrated by FIG. 9, whenever at least one of the four request signals CPUREQP, DMAREQ2P, DMAREQ3P, DMAREQ4P is asserted, the bus arbiter 63 asserts the BUSREQP request signal. If the bus is currently not in use, the memory controller 64 responds by asserting the arbitration timing signal ARBTIMP in the current system clock cycle, during which the bus arbiter 63 performs bus arbitration. If more than one request is present, the bus arbiter 63 arbitrates among the competing requests by following a priority order that depends on the current count value of the counter 61. The decision of the bus arbiter 63 is conveyed by the select signal SEL to the decoder 65 and selectors 66, 67, which connect the selected bus master to the memory controller 64. In the next system clock cycle, the memory controller 64 asserts the acknowledge signal BUSACKP, which is routed by the decoder 65 to the selected bus master, and memory access begins.

As the counter 61 cycles among different count values in synchronization with the system clock signal CLK, the priority-order memory 62 supplies different priority orders (A, B, C, D) to the bus arbiter 63. In the present embodiment, priority shifts cyclically with each clock cycle, one bus master moving from the bottom to the top of the priority order and the other bus masters all moving one position down in priority. Over a period of many clock cycles, all bus masters will have equal opportunity to receive the use of the bus; no bus master is favored over any of the others. If the bus masters issue bus requests with equal frequency, they will be granted statistically equal use of the bus. If they do not issue bus requests with equal frequency, each bus master can still expect to receive its fair share of bus usage, in proportion to its relative number of requests. In the long run, no bus master will be able to monopolize the bus.

As noted above, the first embodiment can be varied by providing various sets of priority orders other than the set shown in FIG. 3, without restriction on the number of priority orders or their content. It is not necessary for all bus masters to receive equal treatment; some bus masters may be intentionally favored over other bus masters.

Several further embodiments of the invention will now be described. In all of these embodiments, the bus masters 1, 2, 3, 4, the memory devices 6, 7, 8, and their connected signal lines and bus lines are as shown in FIG. 1. The embodiments differ in the configuration of the bus controller 5.

Figure 10:
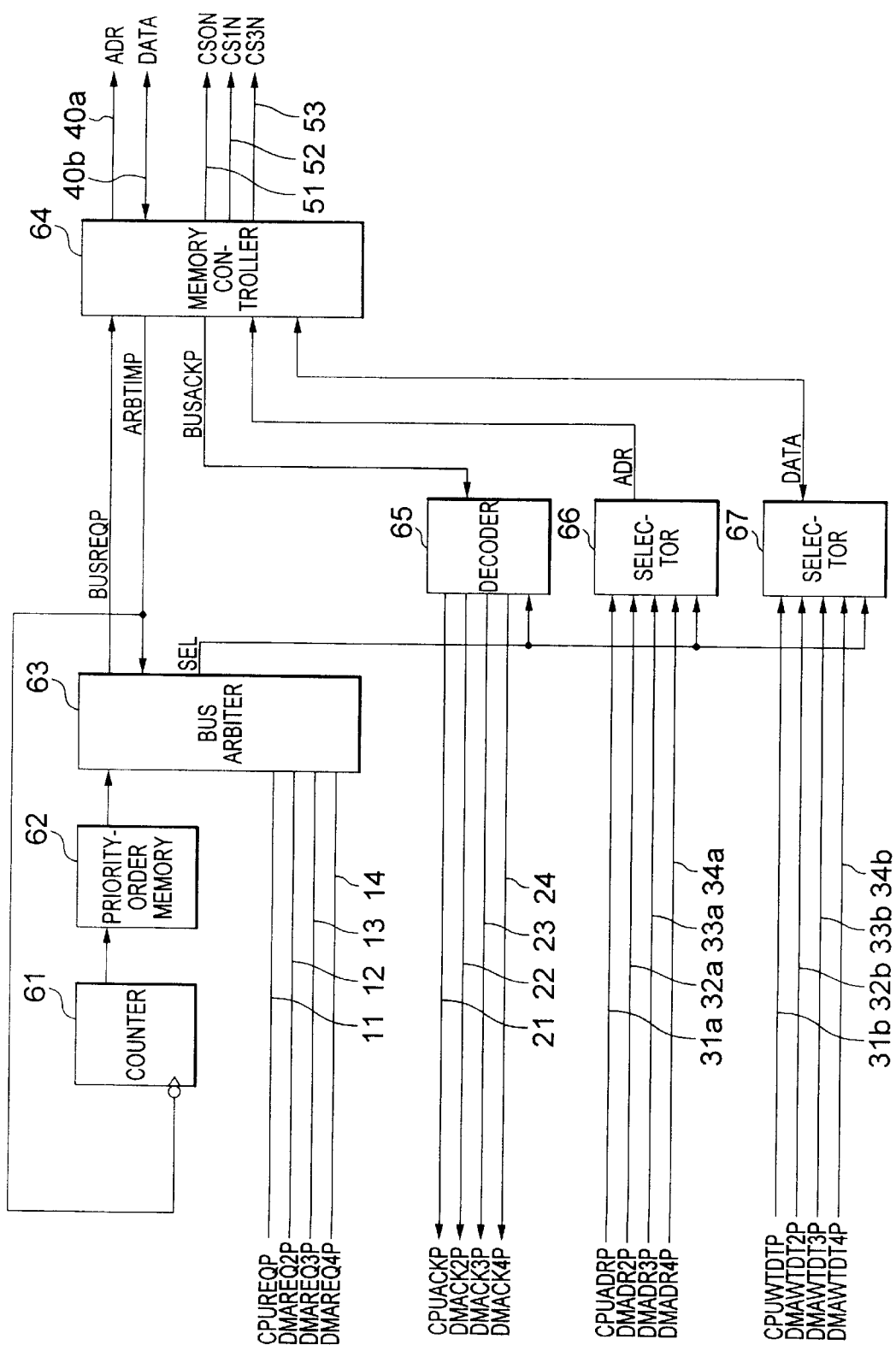
FIG. 10 is a block diagram of the bus controller in a second embodiment of the invention.

Referring to FIG. 10, the bus controller in the second embodiment is identical to the bus controller in the first embodiment, except that the arbitration timing signal ARBTIMP supplied from the memory controller 64 to the bus arbiter 63 is also supplied to the counter 61 as its clock signal. The counter 61 increments in synchronization with high-to-low transitions of ARBTIMP. The count value changes just once each time bus arbitration is performed, instead of changing at every system clock cycle.

The operation of the second embodiment will be described with reference to FIG. 11, which illustrates arbitration among the same request signals as in FIG. 9.

Figure 11:
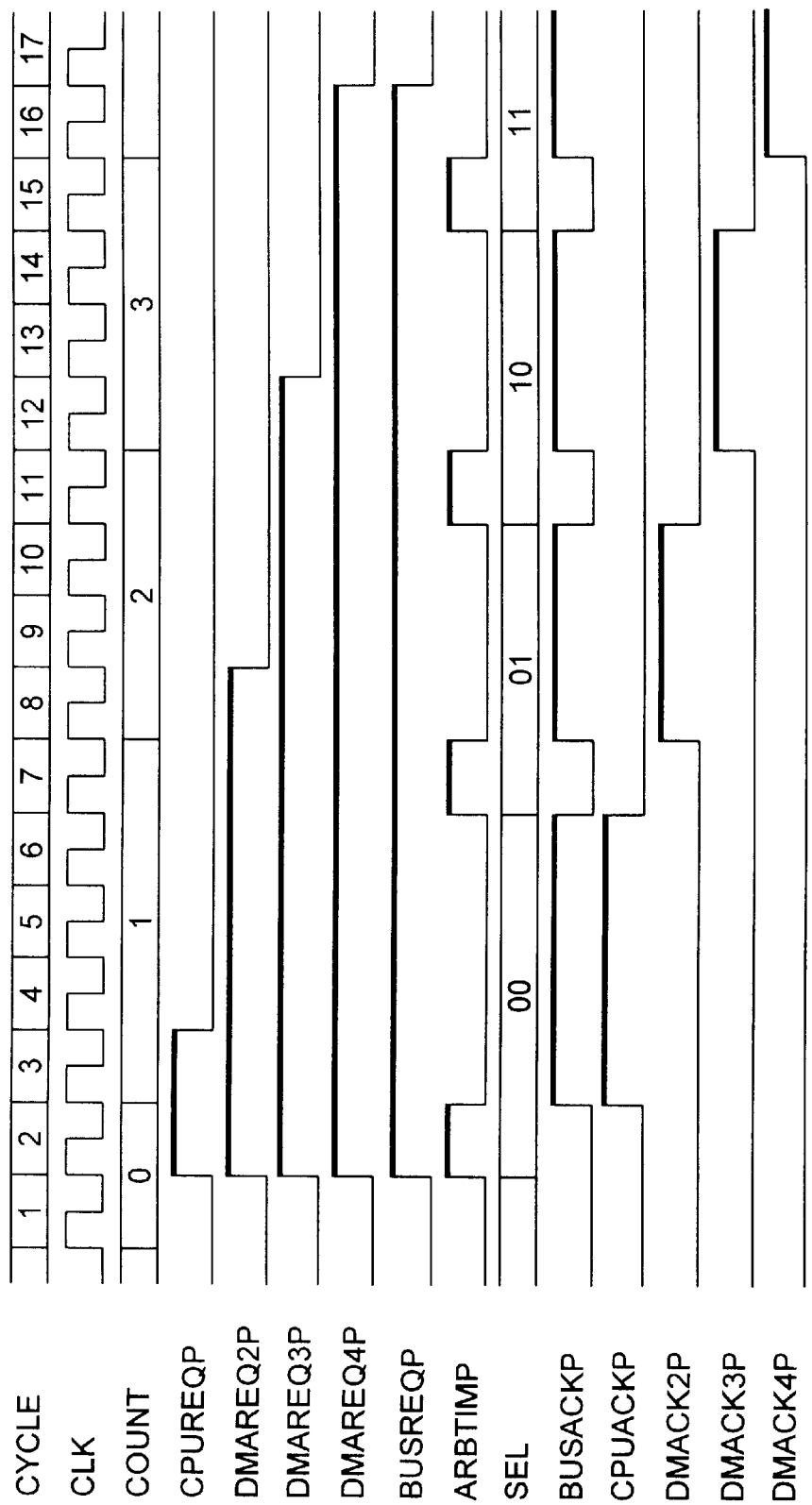
FIG. 11 is a timing diagram illustrating the operation of the second embodiment.

In the second clock cycle in FIG. 11, as the four request signals CPUREQP, DMAREQ2P, DMAREQ3P, DMAREQ4P are asserted, the bus arbiter 63 asserts BUSREQP and the memory controller 64 responds by asserting ARBTIMP, causing the bus arbiter 63 to perform bus arbitration.

The count value output by the counter 61 in the second clock cycle is zero, so the priority-order memory 62 supplies the bus arbiter 63 with priority order A. The pairs of bits in priority order A corresponding to the four request signals CPUREQP, DMAREQ2P, DMAREQ3P, DMAREQ4P now have the following values:

P[7:6]=0

P[5:4]=3

P[3:2]=2

P[1:0]=1

The condition in row twenty-nine of FIG. 5 is true, so the select signal SEL supplied to the decoder 65 and selectors 66, 67 has the value '00.' The decoder 65 selects acknowledge signal line 21, selector 66 selects address bus 31a, and selector 67 selects data bus 31b. The address signal CPUADRP and data signal CPUWTDTP from the CPU 1 are supplied to the memory controller 64.

At the beginning of the third clock cycle, the memory controller 64 negates the arbitration timing signal ARBTIMP, thereby incrementing the counter 61 from zero to one. During the next four clock cycles, the memory controller 64 asserts the acknowledge signal BUSACKP and carries out the memory access requested by the CPU 1, as described in the preceding embodiment. The CPU 1 receives an acknowledge signal (CPUACKP) in the third bus cycle and negates its request signal CPUREQP in the fourth clock cycle. Access ends in the sixth clock cycle.

In the seventh clock cycle, the memory controller 64 negates the acknowledge signal BUSACKP, thereby also negating the acknowledge signal CPUACKP on acknowledge signal line 21. As a result, the CPU 1 is notified that access has ended. Since request signals DMAREQ2P, DMAREQ3P, DMAREQ4P, and BUSREQP are still asserted, the bus arbiter 63 asserts the arbitration timing signal ARBTIMP again.

The count value of the counter 61 is now one, so the priority-order memory 62 supplies priority order B to the bus arbiter 63, which compares the values of the pairs of bits corresponding to request signals DMAREQ2P, DMAREQ3P, and DMAREQ4P. From FIG. 3, these have the following values:

P[5:4]=0

P[3:2]=3

P[1:0]=2

The condition in row twenty-six of FIG. 5 is true, so a select signal SEL with the value '01' is supplied to the decoder 65 and selectors 66, 67. The decoder 65 selects acknowledge signal line 22, selector 66 selects address bus 32a, and selector 67 selects data bus 32b. The address signal DMADR2P and data signal DMAWTDT2P from DMAC 2 are supplied to the memory controller 64.

At the beginning of the eighth clock cycle, the memory controller 64 negates the arbitration timing signal ARBTIMP, incrementing the counter 61 from one to two. During the next three clock cycles, the memory controller 64 carries out the access requested by DMAC 2. DMAC 2 receives acknowledgement (DMACK2P) in the eighth bus cycle, and negates its request signal DMAREQ2P in the ninth clock cycle. Access to the selected memory device ends at the end of the tenth clock cycle.

In the eleventh clock cycle, the memory controller 64 negates the acknowledge signal BUSACKP, thereby also negating the acknowledge signal DMACK2P on acknowledge signal line 22 and notifying DMAC 2 that it no longer has the use of the bus. As request signals DMAREQ3P and DMAREQ4P are still asserted, the bus arbiter 63 asserts the arbitration timing signal ARBTIMP for the next access. The count value of the counter 61 is now two, so priority order C is supplied to the bus arbiter 63, which grants the use of the bus to DMAC 3. In the fifteenth clock cycle, when the access by DMAC 3 has ended, only request signal DMAREQ4P is asserted, so DMAC 4 obtains the right to use the bus.

Like the first embodiment, the second embodiment gives all four bus masters equal opportunity to use the bus. In addition, by incrementing the counter 61 once per bus arbitration cycle, instead of once every system clock cycle, the second embodiment ensures that the bus arbiter 63 uses the different priority orders in a fixed cyclic sequence. This guarantees that over a series of bus arbitration cycles, all bus masters will take turns at the top of the priority order in regular rotation, and no bus master requesting the bus will have its request denied for very long.

Like the first embodiment, the second embodiment is not restricted regarding the number of priority orders or their content, and some bus masters can be intentionally favored over others if so desired.

Next, a third embodiment will be described. The third embodiment loads different combinations of priority orders into the priority-order memory, according to system operating conditions.

Figure 12:
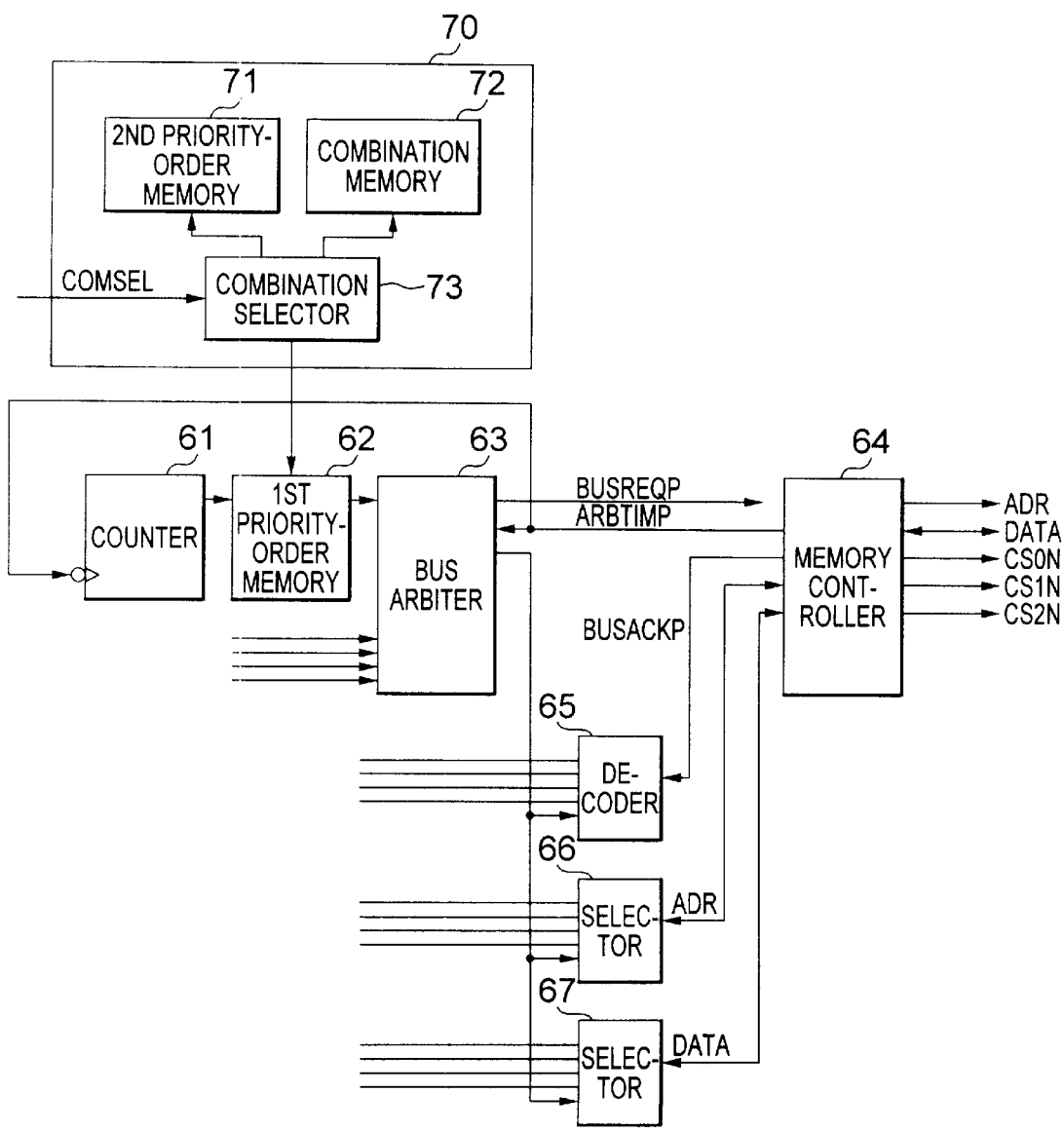
FIG. 12 is a block diagram of the bus controller in a third embodiment of the invention.

Referring to FIG. 12, the third embodiment adds a combination generator 70 to the bus-controller configuration of the second embodiment. The combination generator 70 comprises a second priority-order memory 71, a combination memory 72, and a combination selector 73. The priority-order memory 62, now referred to as the first priority-order memory, is a read-write memory such as a random-access memory (RAM). In other respects, the third embodiment is similar to the second embodiment.

The second priority-order memory 71 stores a plurality of priority orders of the type described above. In the following description, it will be assumed that the second priority-order memory 71 stores eight priority orders A, B, C, D, E, F, G, H.

The combination memory 72 stores information designating at least two different combinations of the priority orders stored in the second priority-order memory 71. Each combination includes one priority order for each count value (zero to three) output by the counter 61. The same priority order may be assigned to different count values. The combinations are stored at different addresses in the combination memory 72. FIG. 13 shows an example in which the combination memory 72 stores five combinations, at addresses numbered from zero to four.

In combination zero, the same priority order A is assigned to all four count values from zero to three.

Combination one is the set of priority orders used in the first and second embodiments, in which A, B, C, D are assigned in this order to the count values from zero to three.

In combination two, priority order A is assigned to even count values, and priority order B to odd count values.

In combination three, priority orders E, F, G, H are assigned in this order to the count values from zero to three.

In combination four, priority order E is assigned to even count values, and priority order F to odd count values.

The combination selector 73 in FIG. 12 receives a combination-select signal COMSEL from the CPU 1, selecting one of the combinations stored in the combination memory 72 by specifying its address. The combination selector 73 reads the priority-order assignments in the selected combination from the combination memory 72, reads the corresponding priority orders from the second priority-order memory 71, and writes these priority orders into the first priority-order memory 62 at addresses corresponding to the count values from zero to three.

The third embodiment operates in the same way as the second embodiment, except that the set of priority orders stored in the priority-order memory 62 is selected by the COMSEL signal, and is changed whenever the value of the COMSEL signal changes. In the example shown in FIG. 13, depending on the COMSEL value, the bus arbiter 63 can cycle among priority orders A, B, C, D, cycle among priority orders E, F, G, H, alternate between priority orders A and B, alternate between priority orders E and F, or use priority order A exclusively.

In the third embodiment, accordingly, the bus arbitration rules can be changed quickly and easily to adapt to different system operation modes, or to process different types of data.

In a variation of the third embodiment, the second priority-order memory 71 and combination memory 72 are replaced by a single memory storing at least two different combinations of priority orders, which are selected directly by the combination-select signal COMSEL.

In another variation, the combination-select signal COMSEL is generated by an external control unit instead of by the CPU 1.

In another variation, the combination generator 70 is added to the bus controller of the first embodiment. Similar effects are obtained.

Next, a fourth embodiment will be described. The fourth embodiment limits the rate at which use of the bus can be granted to the DMACs by masking further requests from each DMAC for a certain interval after the DMAC wins a bus arbitration.

Figure 14:
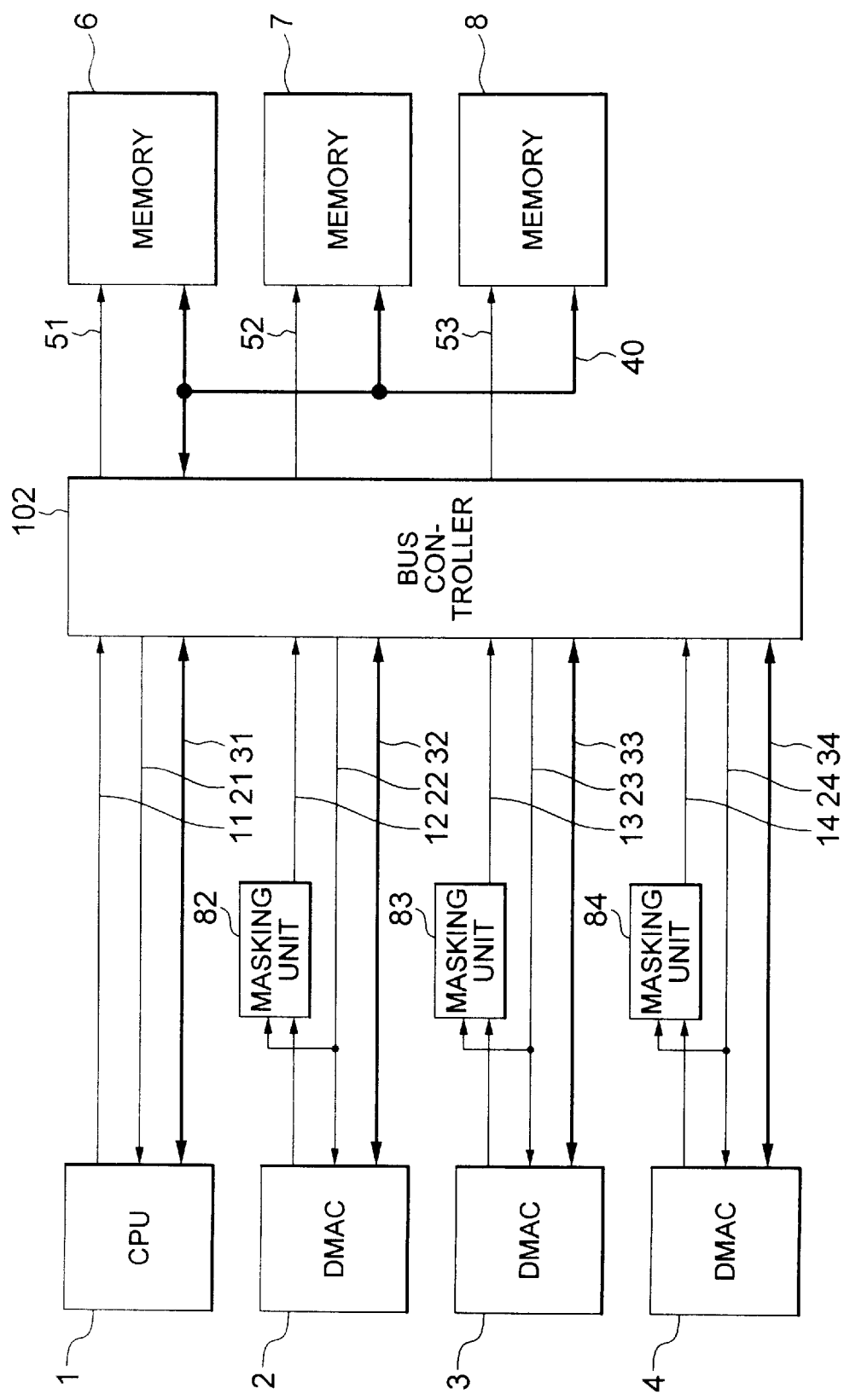
FIG. 14 is a block diagram illustrating a fourth embodiment of the invention.
Figure 15:
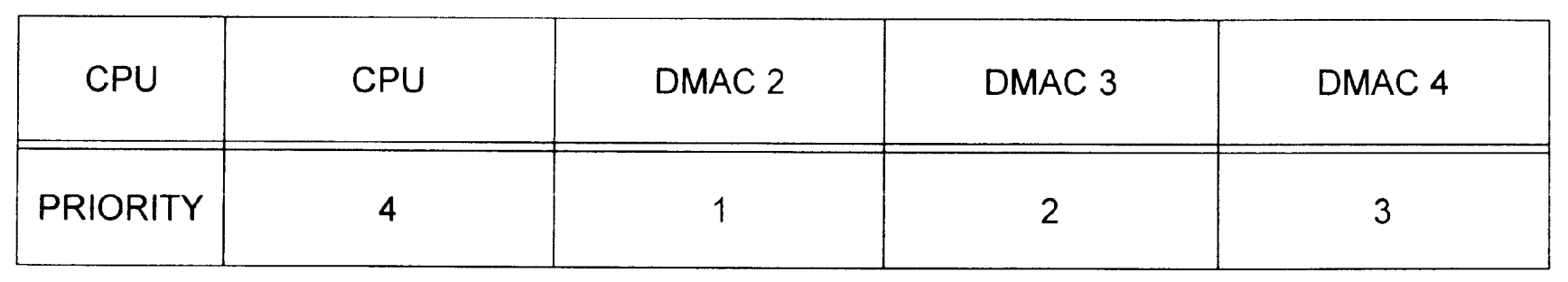

Referring to FIG. 14, the fourth embodiment includes three request signal masking units 82, 83, 84 that temporarily mask the request signals DMAREQ2P, DMAREQ3P, DMAREQ4p from the DMACs 2, 3, 4. The fourth embodiment employs a bus controller 102 of the conventional type with a fixed priority order. Referring to FIG. 15, DMAC 2 has the highest priority (1) in this priority order, followed by DMAC 3 and DMAC 4. The CPU 1 has the lowest priority (4). The input and output signals of the bus controller 102 are as described in the first embodiment.

The three request signal masking units 82, 83, 84 are identical in structure, so only the structure of request signal masking unit 82 will be described below.

Normally, request signal masking unit 82 transmits request signal DMAREQ2P from DMAC 2 to the bus controller 102. When the bus controller 102 grants use of the bus to DMAC 2 by asserting acknowledge signal DMACK2P, however, request signal masking unit 82 temporarily masks request signal DMAREQ2P, preventing the bus controller 102 from recognizing further bus requests from DMAC 2 for a certain interval. In the following description, request signal masking unit 82 masks DMAREQ2P by holding its DMAREQ2P output to the bus controller 102 in the negated state, but if the DMAREQ2P signal line is internally pulled down in the bus controller 102, the request signal masking unit 82 may hold its DMAREQ2P output in the high-impedance state.

Figure 16:
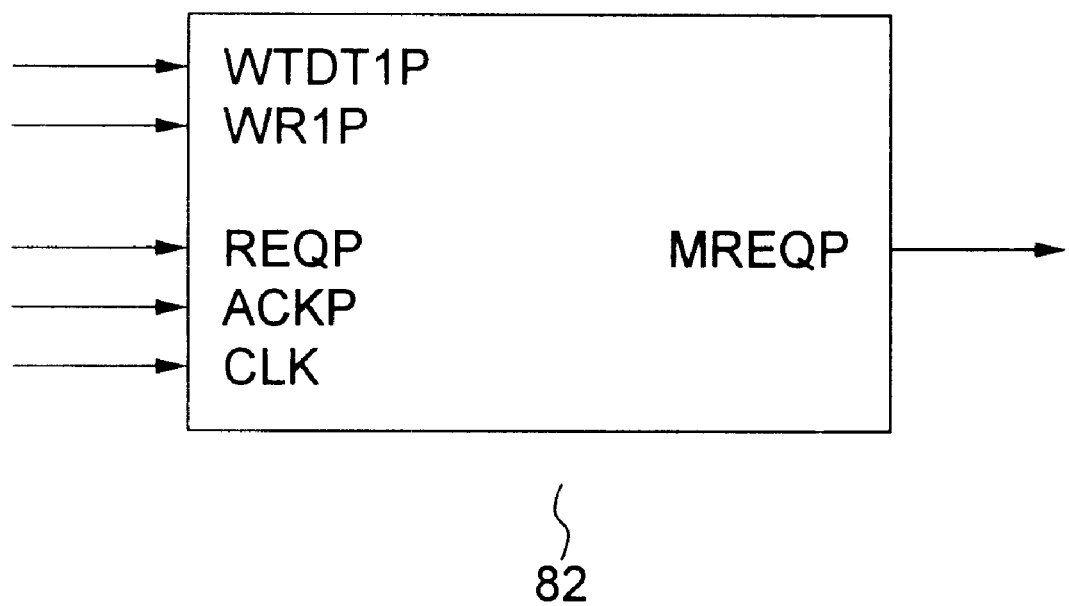
FIG. 16 illustrates the input and output terminals of one of the request signal masking units in the fourth embodiment.

Referring to FIG. 16, request signal masking unit 82 has CLK, REQP, ACKP, WTDT1P, and WRIP input terminals, and an MREQP output terminal. The CLK input terminal receives the system clock signal CLK. The REQP input terminal receives request signal DMAREQ2P from DMAC 2. The ACKP input terminal receives acknowledge signal DMACK2P from the bus controller 102. The WTDT1P input terminal receives write data WD1 from the CPU 1, designating the number of clock cycles for which request signal DMAREQ2P is to be masked. The write data WD1 comprise a plurality of bits, which are input in parallel at the WTDT1P input terminal. The WRIP input terminal receives a write strobe signal WST1 from the CPU 1. The MREQP output terminal sends a DMAREQ2P request signal to the bus controller 102.

Figure 17:
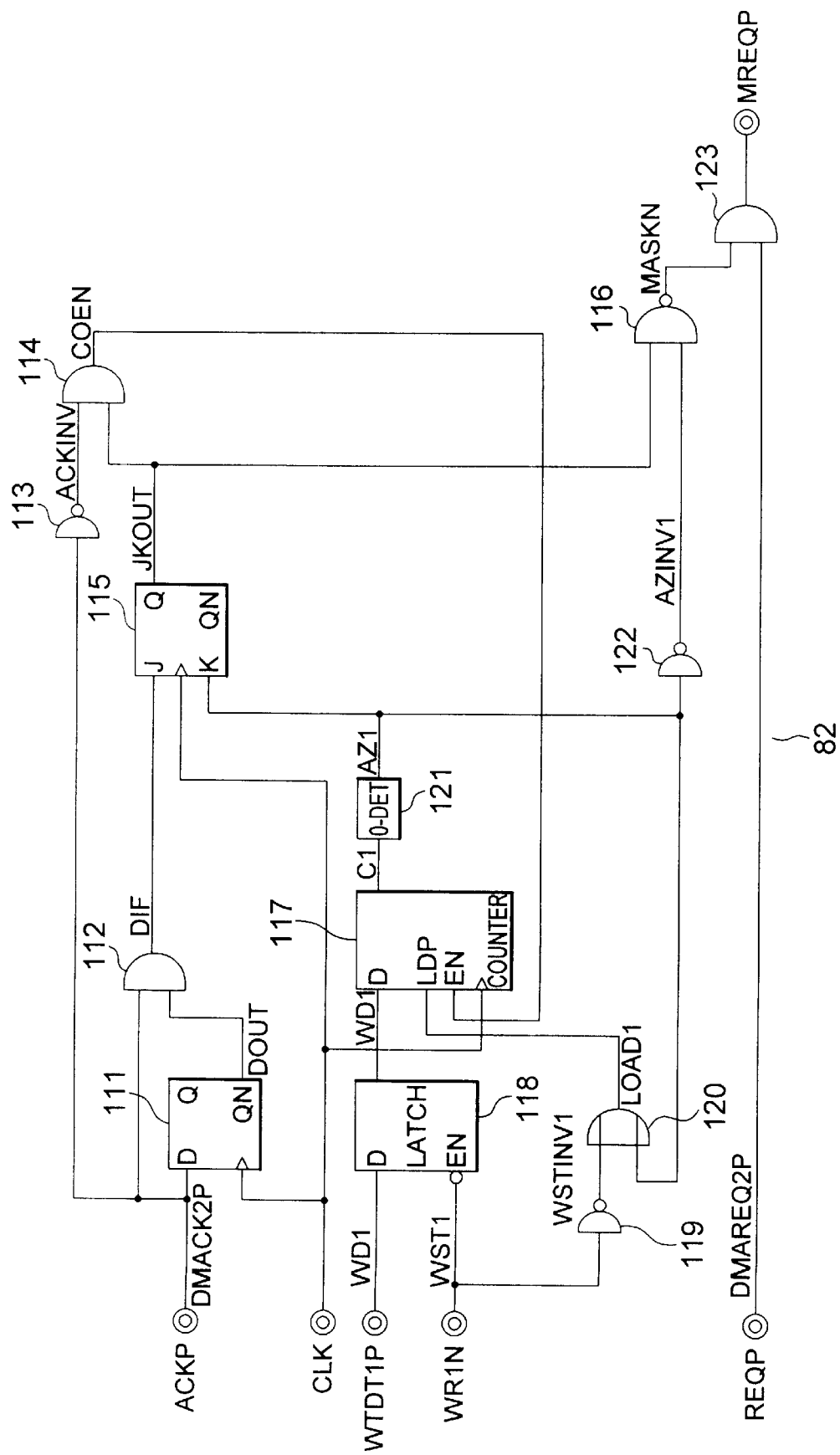
FIG. 17 is a circuit diagram showing the internal structure of this request signal masking unit.

Referring to FIG. 17, request signal masking unit 82 comprises a D-type flip-flop 111, AND gates 112, 114, 123, inverters 113, 119, 122, a JK flip-flop 115, a NAND gate 116, a counter 117, a transparent latch 118, an OR gate 120, and an all-zero detector (0-DET) 121.

The CLK input terminal is coupled to clock input terminals of the D-type flip-flop 111, JK flip-flop 115, and counter 117.

The REQP input terminal is coupled to one input terminal of AND gate 123. The other input terminal of AND gate 123 is coupled to the output terminal of NAND gate 116, from which a mask signal MASKN is received. AND gate 123 takes the logical AND of the mask signal MASKN and the request signal DMAREQ2P from DMAC 2. The output terminal of AND gate 123 is coupled to the output terminal MREQP. While the mask signal MASKN is in the '1' state, AND gate 123 transmits the DMAREQ2P request signal unchanged from DMAC 2 to the bus controller 102. When MASKN is in the '0' state, AND gate 123 masks the DMAREQ2P request signal by holding the MREQP output terminal in the '0' state.

The ACKP input terminal is coupled to the data input terminal (D) of D-type flip-flop 111, to one input terminal of AND gate 112, and to the input terminal of inverter 113. Inverter 113 inverts acknowledge signal DMACK2P from the bus controller 102, and supplies the inverted acknowledge signal ACKINV to AND gate 114. D-type flip-flop 111 inverts and delays DMACK2P by one clock cycle, and supplies the inverted and delayed signal DOUT from its QN output terminal to the other input terminal of AND gate 112. AND gate 112 takes the logical AND of DMACK2P and DOUT, and supplies the resulting signal DIF to the J input terminal of JK flip-flop 115. The K input terminal of JK flip-flop 115 receives an all-zero detection signal AZ1 from the all-zero detector 121. The signal JKOUT produced at the Q output terminal of JK flip-flop 115 is supplied to AND gate 114 and NAND gate 116. AND gate 114 takes the logical AND of JKOUT and the inverted acknowledge signal ACKINV, and supplies the result as a counter enable signal COEN to the enable input terminal (EN) of the counter 117.

The WTDT1P input terminal is coupled to the data (D) input terminal of the latch 118. The WR1N input terminal is coupled to the enable (EN) input terminal of the latch 118, and to the input terminal of inverter 119. The output terminal of the latch 118 is coupled to the data input terminal (D) of the counter 117. Inverter 119 inverts the write strobe signal WST1, and supplies the resulting inverted write strobe signal WSTINV1 to one input terminal of the OR gate 120. The other input terminal of OR gate 120 receives the output signal AZ1 of the all-zero detector 121. By taking the logical OR of WSTINV1 and AZ1, the OR gate 120 generates a load signal LOAD1, which is supplied to a load input terminal (LDP) of the counter 117.

The counter 117 loads the write data WD1 supplied from the latch 118 when the load signal LOAD1 is asserted; that is, when LOAD1 is in the '1' state. The loaded value is output from the counter 117 to the all-zero detector 121 as a count value C1. While the counter enable signal COEN is asserted ('1'), the counter 117 decrements the count value C1 by one at each clock cycle, provided the LOAD1 signal is not asserted. If LOAD1 and COEN are asserted simultaneously, the counter 117 obeys the LOAD1 signal. The AZ1 signal output by the all-zero detector 121 is set to the '1' state when the count value C1 received from the counter 117 is zero, and to the '0' state when the count value C1 is not zero.

The AZ1 signal is also input to inverter 122, which supplies an inverted all-zero detection signal AZINV1 to the NAND gate 116. The NAND gate 116 generates the mask signal MASKN by performing a logical NAND operation on AZINV1 and JKOUT. Accordingly, the DMAREQ2P request signal is masked when AZINV1 and JKOUT are both in the '1' state; that is, when AZ1 is '0' and JKOUT is '1.'

Figure 18:
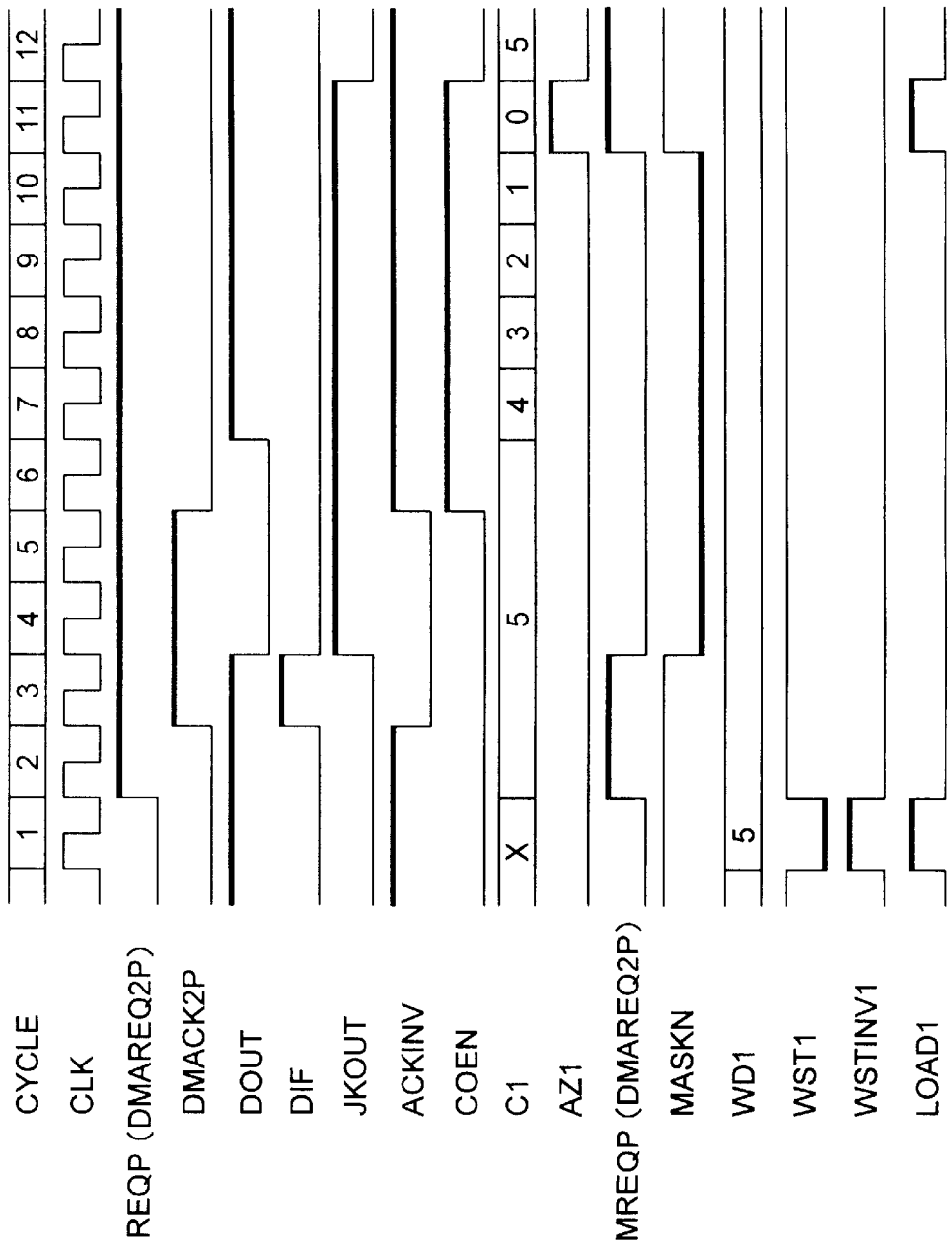
FIG. 18 is a timing diagram illustrating the operation of the fourth embodiment.

The operation of the fourth embodiment will now be described with reference to FIG. 18. Two waveforms are shown for the request signal DMAREQ2P, one being the waveform at the REQP input terminal, the other the waveform at the MREQP output terminal.

Initially, the request signal DMAREQ2P from DMAC 2 and the acknowledge signal DMACK2P from the bus controller 102 are both in the negated state ('0'). In the request signal masking unit 82, the JKOUT signal output from the JK flip-flop 115 is in the '0' state, so the mask signal MASKN output by NAND gate 116 is in the '1' state or non-masking state. The count Cl output by the counter 117 has an arbitrary non-zero value (x).

In the first clock cycle, the CPU 1 outputs write data WD1 with the value five (5) and asserts the write strobe signal WST1. Reception of WD1 at the WTDT1P input terminal and WST1 at the WR1N input terminal of request signal masking unit 82 causes the latch 118 to begin output of the WD1 value (five). Inverter 119 inverts the write strobe signal WST1, setting WSTINV1 to the '1' state and causing OR gate 120 to assert the LOAD1 signal. The counter 117 thus loads the value five received from the latch 118.

In the second clock cycle, the count value C1 changes from its previous value (x) to the newly loaded value of five. The all-zero detector 121 continues to detect that C1 is not zero, and holds the AZ1 signal in the '0' state.

Starting in this second clock cycle, DMAC 2 asserts the DMAREQ2P request signal. Since the mask signal MASKN is in the non-masking ('1') state, the DMAREQ2P signal output at the MREQP terminal is likewise asserted. In addition, the CPU 1 negates the write strobe signal WST1, causing the latch 118 to retain the WD1 value of five, and causing inverter 119 to set the inverted write strobe signal WSTINV1 to the '0' state. Since the AZ1 signal is also in the '0' state, the LOAD1 signal output by OR gate 120 is reset to the '0' state.

During the first and second clock cycles, the DMACK2P acknowledge signal and hence the DIF signal remain in the '0' state. The '0' state of DIF, which is input at the J input terminal of the JK flip-flop 115 during these two cycles, holds the JKOUT signal in the '0' state during the second and third clock cycles. In addition, the DOUT signal, being equal to DMACK2P inverted and delayed by one clock cycle, remains in the '1' state during the second and third clock cycles.

In the third clock cycle, the bus controller 102 responds to the assertion of the DMAREQ2P request signal by granting use of the bus to DMAC 2, which has highest priority, and asserts the DMACK2P acknowledge signal. Receiving the DMACK2P signal, DMAC 2 recognizes that the requested access has begun. The DMACK2P signal is also inverted by inverter 113, causing ACKINV to go the '0' state.

During this third cycle, DMACK2P and DOUT are both in the '1' state, causing the DIF signal output by the AND gate 112 to go to the '1' state, while the AZ1 signal output by the all-zero detector 121 remains in the '0' state. The JK flip-flop 115 now receives a '1' (DIF) at its J input terminal and a '0' (AZ1) at its K input terminal; this combination of inputs sets the JKOUT signal to '1' in the fourth clock cycle.

As memory access by DMAC 2 continues during the fourth and fifth clock cycles, the acknowledge signal DMACK2P remains in the '1' state and the inverted acknowledge signal ACKINV remains in the '0' state. The counter enable signal COEN output by AND gate 114 therefore remains in the '0' state, and the count value C1 remains five. The AZ1 signal output by the all-zero detector 121 remains in the '0' state, and the inverted signal AZINV1 output by inverter 122 remains in the '1' state.

In the fourth clock cycle, both inputs (JKOUT and AZINV1) to NAND gate 116 are '1,' causing output of a '0' mask signal MASKN that negates the DMAREQ2P request signal output from the MREQP output terminal, even though DMAC 2 continues to assert DMAREQ2P at the REQP input terminal. This masking of DMAREQ2P continues as long as the count value C1 is not zero, for the following reason: while C1 is not zero, the AZ1 signal is in the '0' state; input of this '0' state to the K input terminal of JK flip-flop 115 holds JKOUT in the '1' state; the inverted signal AZINV1 output by inverter 122 is also in the '1' state; NAND gate 116 therefore receives '1' at both input terminals and asserts the mask signal MASKN by outputting a '0.'

Also in the fourth clock cycle, the delayed and inverted signal DOUT output by the D-type flip-flop 111 goes to the '0' state, since DMACK2P was '1' in the preceding cycle. The DIF signal output by AND gate 112 is therefore '0' in the fourth cycle. The '1' value of DMACK2P in the fourth and fifth cycles holds DOUT in the '0' state during the fifth and sixth cycles.

In the sixth clock cycle, the bus controller 102 negates the acknowledge signal DMACK2P, indicating that access by DMAC 2 has ended. Although DMAC 2 continues to assert the request signal DMAREQ2P, this signal is masked as described above, and is not recognized by the bus controller 102. ACKINV is now '1,' because DMACK2P is '0,' and JKOUT is also '1,' so the counter enable signal COEN output by AND gate 114 assumes the '1' state. At the end of the sixth clock cycle, the counter 117 decrements the count value Cl from five to four.

During the seventh to tenth clock cycles, masking of the request signal DMAREQ2P continues while the counter 117 decrements the count value Cl from four to one. The values of the other signals in FIG. 18 do not change during these clock cycles, except that the DOUT signal output by the D-type flip-flop 111 reverts to the '1' state. Since DMAREQ2P is masked, the bus controller 102 can grant the use of the bus to another bus master during these clock cycles. At the end of the tenth clock cycle, the count value Cl changes from one to zero.

In the eleventh clock cycle, since the count value Cl is zero, the AZ1 signal output by the all-zero detector 121 is set to the '1' state. This immediately causes the inverted signal AZINV1 output by inverter 122 to go to the '0' state and the mask signal MASKN output by NAND gate 116 to go to the '1' state, ending the masking of the request signal DMAREQ2P. As DMAC 2 continues to assert this request signal DMAREQ2P, the output at the MREQP output terminal goes to the '1' state. As soon as the bus controller 102 completes whatever access it is currently performing for another bus master, it will recognize the DMAREQ2P request signal and grant the use of the bus to DMAC 2 again.

The '1' value of the AZ1 signal is also received by OR gate 120, which accordingly drives the LOAD1 signal to the '1' state during the eleventh clock cycle. The value five, which is still latched in the latch 118, is thereby reloaded into the counter 117. Output of the reloaded value as the count value Cl begins in the twelfth clock cycle.

In the eleventh clock cycle, the JK flip-flop 115 receives '0' (DIF) at its J input terminal and '1' (AZ1) at its K input terminal. This combination of inputs resets the JKOUT signal to the '0' state in the twelfth clock cycle.

In the twelfth clock cycle, the request signal masking unit 82 is in the same state as in the second clock cycle, waiting for the bus controller 102 to acknowledge the DMAREQ2P request signal.

In the fourth embodiment, masking of the DMAREQ2P request signal begins one clock cycle after the acknowledge signal DMACK2P is asserted, and continues for N clock cycles after DMACK2P is negated, where N is the value provided as write data WD1. Accordingly, even though DMAC 2 has the highest priority in the fixed priority order used by the bus controller 102, DMAC 2 cannot monopolize the bus by holding the DMAREQ2P signal in the asserted state.

The request signals DMAREQ3P and DMAREQ4P from DMAC 3 and DMAC 4 are similarly masked by request signal masking units 83 and 84. By providing write data that adjust the masking intervals of the request signal masking units 82, 83, 84 to suitable lengths, the CPU 1 can program the masking intervals to ensure that even the bus master with the lowest priority, in this case the CPU 1 itself, has ample opportunity to use the bus.

A useful feature of the fourth embodiment is that the lengths of the masking intervals can be modified dynamically, in response to varying system processing loads, for example. New data can be written into the latch 118 at any time, and the new data will immediately be loaded into the counter 117, so prompt adjustments can be made to changing conditions.

In the fourth embodiment, response signal masking units were provided for all but the lowest-priority bus master, but other configurations are possible. Response signal masking units may be provided for all of the bus masters, for example, or for only one bus master. A general rule is that the higher the priority of the bus master is, the greater is the effect of providing a response signal masking unit for it.

In another variation of the fourth embodiment, the write data WD1 and strobe signal WST1 are generated by an external control device other than the CPU 1.

Response signal masking units may also be provided in the first three embodiments.

Next, a fifth embodiment will be described. The fifth embodiment takes CPU interrupts into account in performing bus arbitration.

Figure 19:
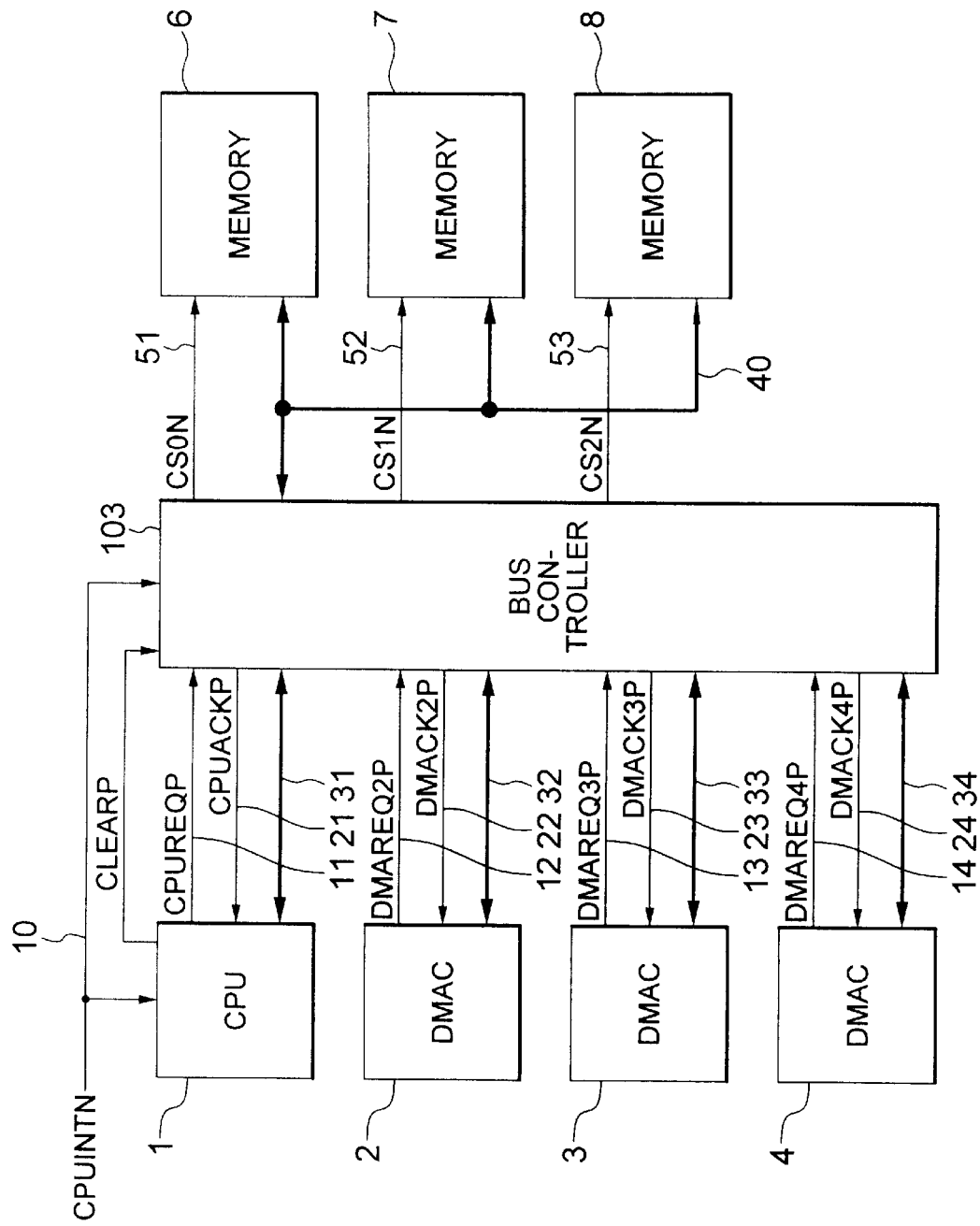
FIG. 19 is a block diagram of a bus arbitration system illustrating a fifth embodiment of the invention.

Referring to FIG. 19, the fifth embodiment has a CPU interrupt signal line 10 which is coupled to both the CPU 1 and the bus controller 103. The CPU interrupt signal CPUINTN on this signal line is generated by a circuit not shown in the drawing to request some type of service by the CPU 1. When CPUINTN is asserted, the CPU 1 interrupts its normal processing and begins executing an interrupt-handling program. After processing the interrupt, the CPU 1 sends a clear signal CLEARP to the bus controller 103.

Figure 20:
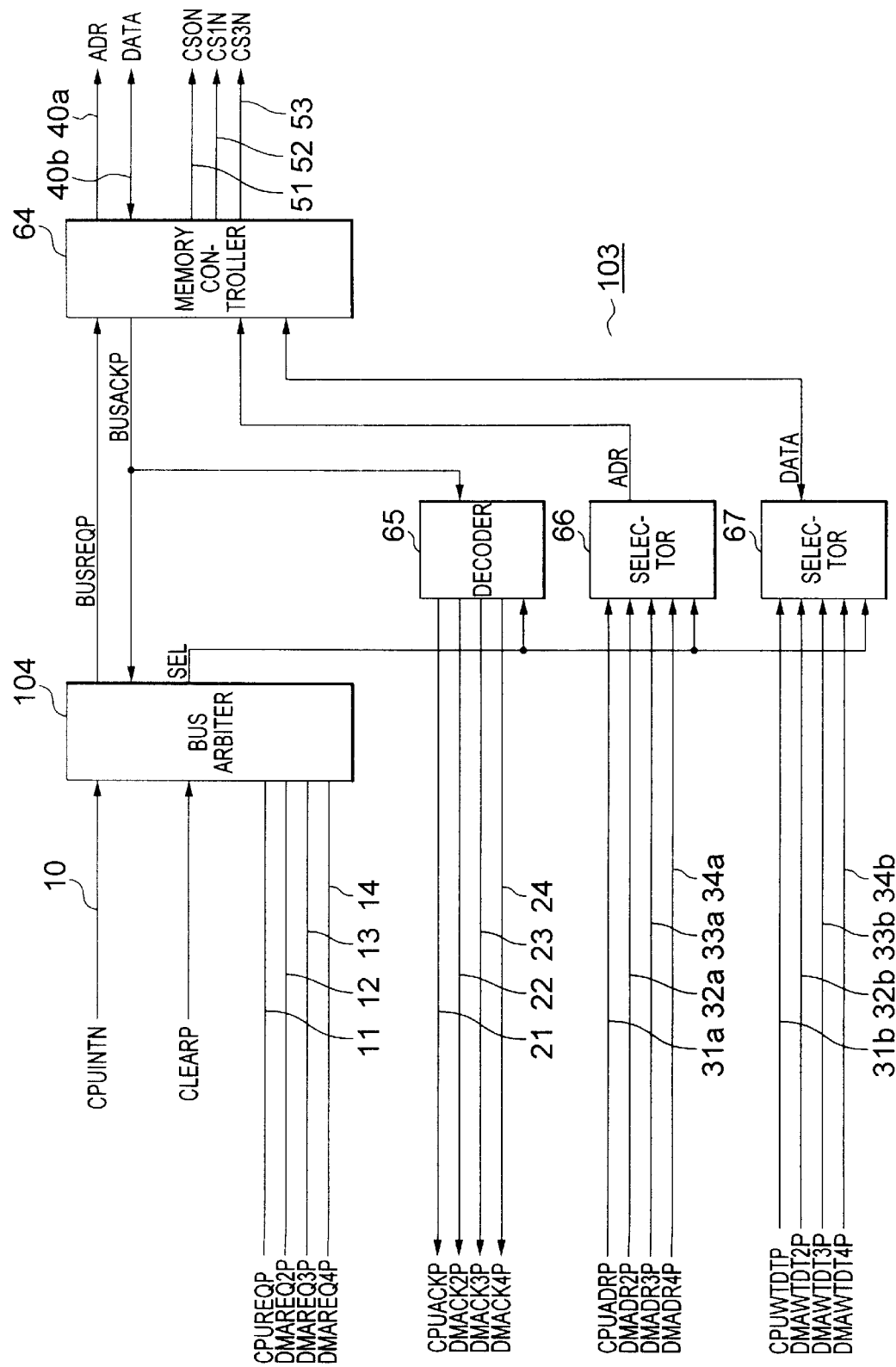
FIG. 20 is a block diagram of the bus controller in the fifth embodiment.

Referring to FIG. 20, the bus controller 103 comprises the memory controller 64, decoder 65, and selectors 66, 67 described in the first embodiment, and a bus arbiter 104 that receives the CPU interrupt signal CPUINTN and clear signal CLEARP. The bus arbiter 104 also sends a request signal BUSREQP to the memory controller 64 and a select signal SEL to the decoder 65 and selectors 66, 67, and receives the acknowledge signal BUSACKP generated by the memory controller 64. The select signal SEL has the same values as in the first embodiment, '00' selecting the CPU 1, '01' selecting DMAC 2, '10' selecting DMAC 3, and '11' selecting DMAC 4.

Figure 21:
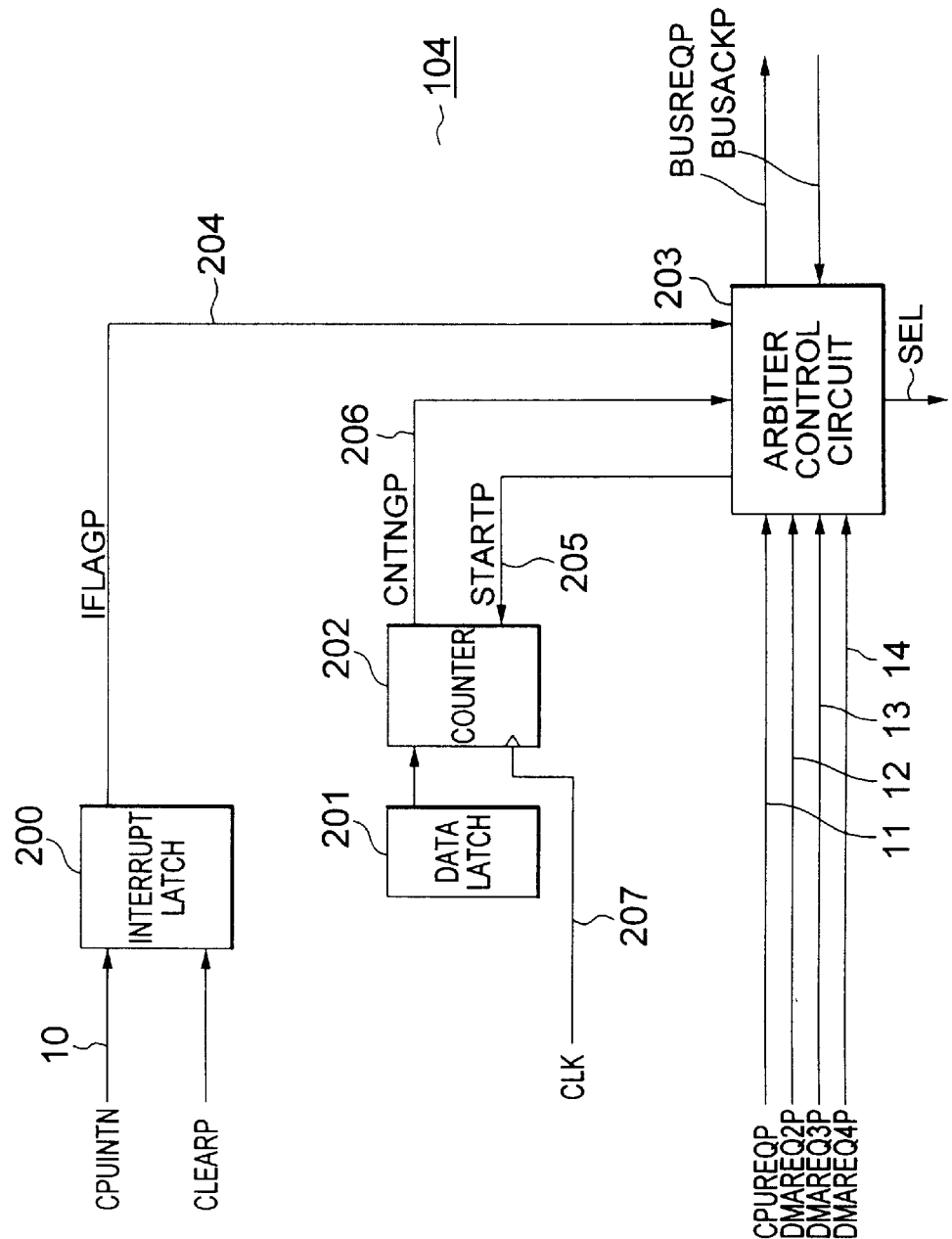
FIG. 21 is a block diagram of the bus arbiter in FIG. 20.

Referring to FIG. 21, the bus arbiter 104 comprises an interrupt latch 200, a data latch 201, a counter 202, and an arbiter control circuit 203.

The interrupt latch 200 receives the CPU interrupt signal CPUINTN and clear signal CLEARP, and sets an interrupt flag signal IFLAGP, which is supplied on a signal line 204 to the arbiter control circuit 203. The interrupt flag signal IFLAGP is set to '1' when CPUINTN is asserted, and is cleared to '0' when CLEARP is asserted.

The arbiter control circuit 203 receives request signals CPUREQP, DMAREQ2P, DMAREQ3P, DMAREQ4P from the CPU 1 and DMACs 2, 3, 4, receives the acknowledge signal BUSACKP, and generates the request signal BUSREQP and select signal SEL. The arbiter control circuit 203 carries out bus arbitration whenever BUSREQP is asserted and BUSACKP is negated, using a fixed priority order in which DMAC 2 has the highest priority, followed by DMAC 3, DMAC 4, and lastly the CPU 1. The arbiter control circuit 203 also sends a starting signal STARTP to the counter 202 on a count start signal line 205, and receives a counting signal CNTNGP from the counter 202 on a counting signal line 206.

The data latch 201 holds a value that is programmed in advance by the CPU 1. The counter 202 loads this value from the data latch 201, and counts down from this value in synchronization with a clock signal CLK, which is received on a clock signal line 207.

Figure 22:
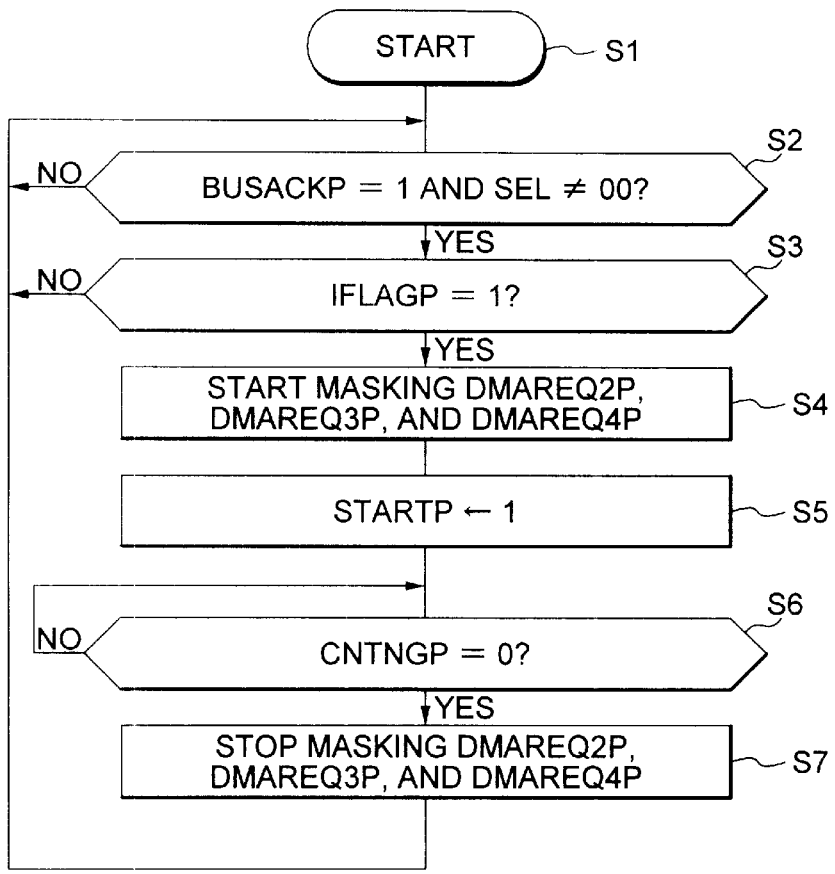
FIG. 22 is a flowchart illustrating the operation of the arbiter control circuit in FIG. 21.

The operation of the arbiter control circuit 203 will be further described with reference to FIG. 22. The operations in FIG. 22 are carried out in parallel with other bus arbitration operations.

Once started in step S1, the arbiter control circuit 203 repeats a loop comprising steps S2 to S7. In step S2, the arbiter control circuit 203 waits for the memory controller 64 to acknowledge a request signal from any one of the DMACs 2, 3, 4. That is, the arbiter control circuit 203 waits for the memory controller 64 to assert BUSACKP when the select signal SEL has a value ('01,' '10,' or '11') selecting one of the DMACs 2, 3, 4. When this event occurs, the arbiter control circuit 203 proceeds in step S3 to test the interrupt flag IFLAGP. If IFLAGP is not set to '1,' the arbiter control circuit 203 returns to step S2. If IFLAGP is set to '1,' the arbiter control circuit 203 proceeds to step S4.

In step S4, the arbiter control circuit 203 masks request signals DMAREQ2P, DMAREQ3P, DMAREQ4P. That is, the arbiter control circuit 203 internally stops recognizing DMAREQ2P, DMAREQ3P, DMAREQ4P, even if they are asserted, and recognizes only CPUREQP. Next, in step S5, the arbiter control circuit 203 asserts the start signal STARTP, causing the counter 202 to load the value stored in the data latch 201, assert the CNTNGP signal, and start counting down. In step S6, the arbiter control circuit 203 waits for the counter 202 to stop counting, as indicated by negation of the CNTNGP signal. When CNTNGP is negated, in step S7, the arbiter control circuit 203 unmasks the request signals DMAREQ2P, DMAREQ3P, DMAREQ4P.

Figure 23:
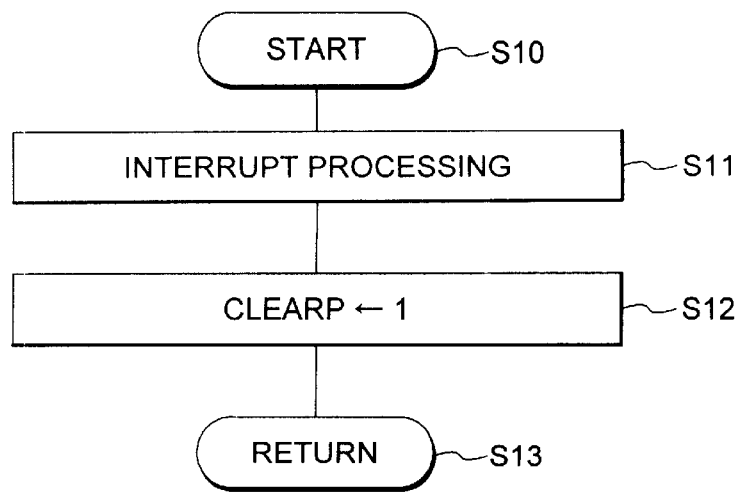
FIG. 23 is a flowchart illustrating interrupt processing in the fifth embodiment.

FIG. 23 illustrates the operation of the CPU 1 in processing an interrupt. The operation starts in step S10 when the CPUINTN signal is asserted by an external device. Processing of the interrupt is carried out in step S11 by the interrupt-handling program mentioned above. In step S12, after processing of the interrupt is completed, the interrupt-handling program executes an instruction that asserts the clear signal CLEARP for one clock cycle. In steps S13, the CPU 1 returns to normal processing.

Figure 24:
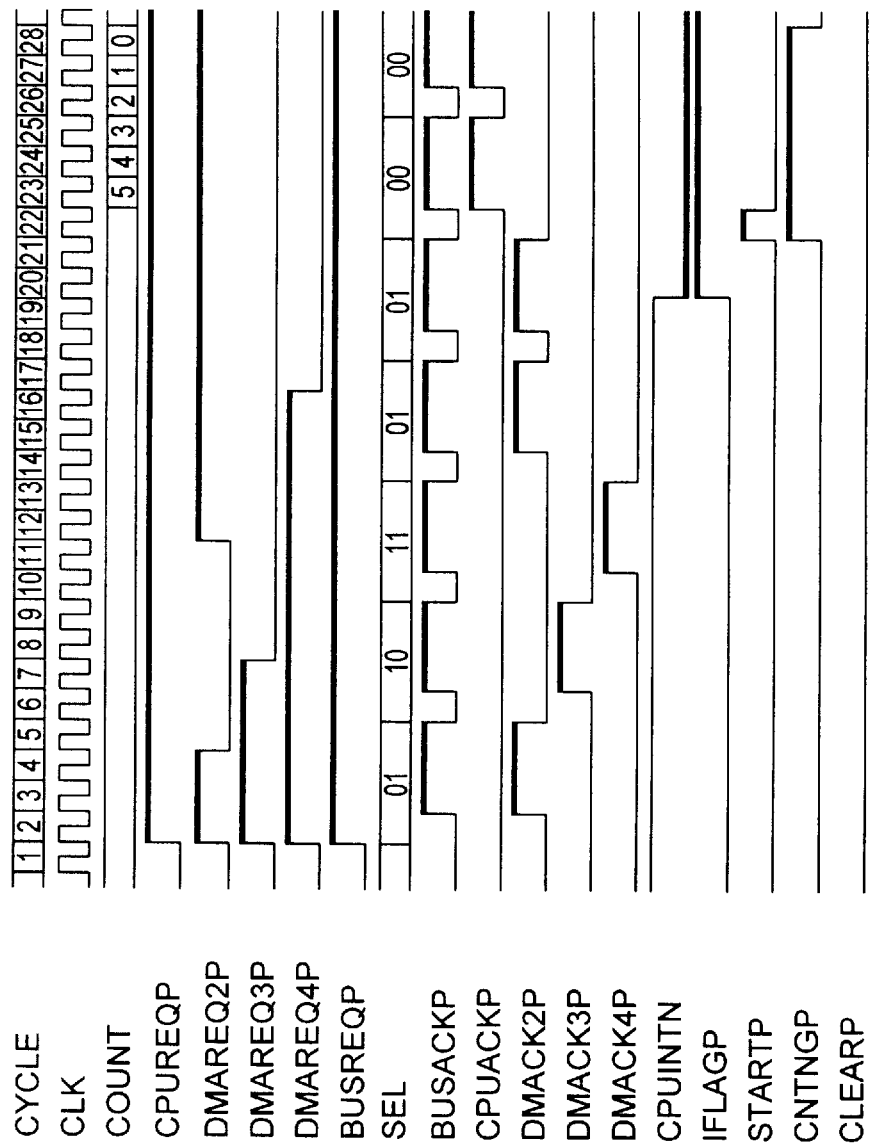
FIGS. 24 and 25 are a timing diagram illustrating the operation of the fifth embodiment.
Figure 25:
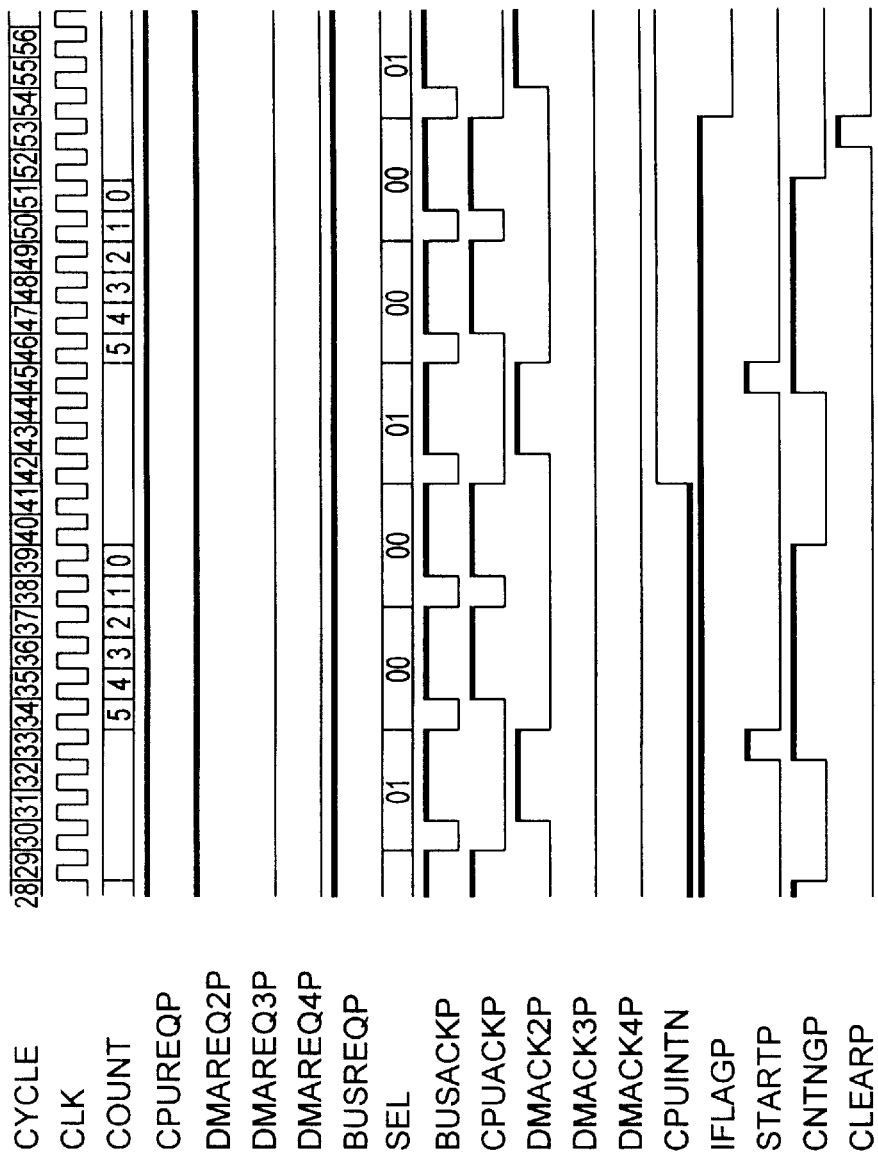

FIGS. 24 and 25 illustrate the operation of the fifth embodiment for a case in which the value five is stored in the data latch 201. Initially, all bus request signals CPUREQP, DMAREQ2P, DMAREQ3P, DMAREQ4P are negated, BUSREQP and BUSACKP are both negated, no bus master is using the shared bus, and the CPU 1 is not processing an interrupt. The CPU interrupt signal CPUINTN is in the negated ('1') state, and the interrupt flag IFLAGP is also in the negated ('0') state.

In the second clock cycle, all four bus masters assert their bus request signals. The arbiter control circuit 203 arbitrates among these requests by selecting the highest-priority bus master DMAC 2, and sets the select signal SEL to '01' to command the decoder 65 and selectors 66, 67 to select the signal lines coupled to DMAC 2.

During the third, fourth, and fifth clock cycles, the memory controller 64 asserts the BUSACKP acknowledge signal, which the decoder 65 translates into the DMACK2P acknowledge signal, and the memory controller 64 carries out the memory access requested by DMAC 2. At the end of the fourth clock cycle, DMAC 2 temporarily negates its request signal DMAREQ2P.

Memory access continues in this general pattern throughout the illustrated operations, one bus arbitration clock cycle being followed by three memory access clock cycles. In the bus arbitration in the sixth clock cycle, the arbiter control circuit 203 selects DMAC 3, setting SEL to '10.' In the eighth clock cycle, while using the shared bus, DMAC 3 negates its request signal DMAREQ3P. In the bus arbitration in the tenth clock cycle, the arbiter control circuit 203 selects DMAC 4, setting SEL to '11.' In the twelfth clock cycle, DMAC 2 reasserts its request signal DMAREQ2P. In the bus arbitration in the fourteenth clock cycle, the arbiter control circuit 203 selects DMAC 2, setting SEL to '01' again. DMAC 2 continues to assert its request signal DMAREQ2P, so in the next bus arbitration in the eighteenth clock cycle, the arbiter control circuit 203 again selects DMAC 2.

During the events so far, the arbiter control circuit 203 also continues to cycle between steps S2 and S3 in FIG. 22, repeatedly recognizing that the memory controller 64 has acknowledged a bus request from one of the DMACs, but taking no further action because the interrupt flag IFLAGP is negated.

In the twentieth clock cycle, the CPU interrupt signal CPUINTN is asserted, setting the interrupt flag IFLAGP to the '1' state. In the twenty-first clock cycle, the arbiter control circuit 203 recognizes that BUSACKP is asserted, SEL is '01,' and IFLAGP is '1.' In the next (twenty-second) clock cycle, accordingly, the arbiter control circuit 203 proceeds to steps S4 and S5 in FIG. 22, internally masking the request signals DMAREQ2P, DMAREQ3P, DMAREQ4P from the DMACs 2, 3, 4, and asserting the starting signal STARTP. The counter 202 immediately responds by asserting the CNTNGP signal.

The twenty-second clock cycle is also a bus arbitration cycle. Since DMAREQ2P, DMAREQ3P, and DMAREQ4P are masked, the arbiter control circuit 203 recognizes only the CPUREQP request signal, and sets the select signal SEL to '00,' selecting the CPU 1. During the next three clock cycles, the memory controller 64 carries out a memory access requested by the CPU 1. During these clock cycles, the counter 202 also loads the value five from the data latch 201 and begins counting down toward zero. The arbiter control circuit 203 negates the starting signal STARTP and waits for the counter 202 to negate the counting signal CNTNGP.

In the twenty-sixth clock cycle, the arbiter control circuit 203 performs another bus arbitration. Since the counter 202 is still counting, request signals DMAREQ2P, DMAREQ3P, and DMAREQ4P remain masked, and the arbiter control circuit 203 again sets the select signal SEL to '00.' In the next three clock cycles, the memory controller 64 performs another memory access requested by the CPU 1.

The counter 202 reaches zero in the twenty-eighth clock cycle. The count underflows in the twenty-ninth clock cycle, shown in FIG. 25, causing the counter 202 to stop counting and negate the CNTNGP signal. The arbiter control circuit 203 now carries out step S7 in FIG. 22 and again begins recognizing request signals from the DMACs 2, 3, 4, among which request signals DMAREQ2P is still asserted.

In the bus arbitration in the thirtieth clock cycle in FIG. 25, since DMAREQ2P is asserted, the arbiter control circuit 203 sets the select signal SEL to '01.' In the thirty-first bus cycle, the memory controller 64 asserts BUSACKP and begins performing the memory access requested by DMAC 2. In the thirty-second bus cycle, the arbiter control circuit 203 recognizes that BUSACKP and IFLAGP are asserted and SEL is '01.' In the thirty-third bus cycle, accordingly, the arbiter control circuit 203 asserts STARTP and resumes masking of the request signals from the DMACs 2, 3, 4.

Similar operations continue. The CPU 1 wins the bus arbitration twice, in the thirty-fourth and thirty-eighth clock cycles, while the counter 202 is counting and the request signals from the DMACs are masked; then the count underflows, masking stops, and DMAC 2 wins the bus arbitration in the forty-second clock cycle. In this clock cycle, the CPU interrupt signal CPUINTN is negated (reset to '1'), but the CPU 1 is still engaged in interrupt processing, and the interrupt flag IFLAGP remains asserted (set to '1'). In the forty-fourth clock cycle, the arbiter control circuit 203 again recognizes that BUSACKP and IFLAGP are asserted and SEL is '01,' so the bus requests from the DMACs are masked once more, and the CPU 1 wins the next two bus arbitrations. The bus requests from the DMACs are unmasked when the counter 202 stops counting in the fifty-second clock cycle.

In the fifty-third bus cycle, the CPU 1 finishes processing the interrupt and asserts the clear signal CLEARP for one clock cycle. In the fifty-fourth clock cycle, the interrupt flag IFLAGP is cleared to '0.' Bus arbitration is performed in this clock cycle, and the use of the bus is granted to DMAC 2. Subsequent bus arbitration will be performed on the basis of the normal priority order of the bus masters, until the next CPU interrupt occurs.

In the fifth embodiment, during normal processing, the CPU 1 defers to all bus requests from the DMACs 2, 3, 4. During interrupt processing, however, the CPU is assured of winning at least N out of every N+1 bus arbitration cycles, where the value of N depends on the value set in the data latch 201. In the example in FIGS. 24 and 25, the CPU 1 won two out of three bus arbitration cycles during interrupt processing.

The fifth embodiment is suitable for use in interrupt-driven systems in which the CPU 1 normally performs non-urgent background tasks, but must be able to provide fast service to interrupts. A feature of the fifth embodiment is that the value stored in the data latch 201 is programmable and can be altered dynamically, by the CPU 1 itself, for example, according to the urgency of the interrupt.

In a variation of the fifth embodiment, the counter 202 counts up instead of down, and stops counting when the count overflows. Similar effects are obtained.

In another variation, the memory controller 64 sends the bus arbiter 104 an arbitration timing signal (ARBTIMP), as in the first embodiment, to indicate the times at which bus arbitration should be performed. This variation also applies to the subsequent embodiments.

Next, a sixth embodiment will be described. The sixth embodiment modifies the priority order of the bus masters when a bus request from the lowest-priority bus master is left unacknowledged for a certain interval of time. The general configuration of the sixth embodiment is as described in the fifth embodiment, shown in FIGS. 19 and 20, except that the bus controller and bus arbiter do not receive a CPU interrupt signal.

Figures 26, 28:
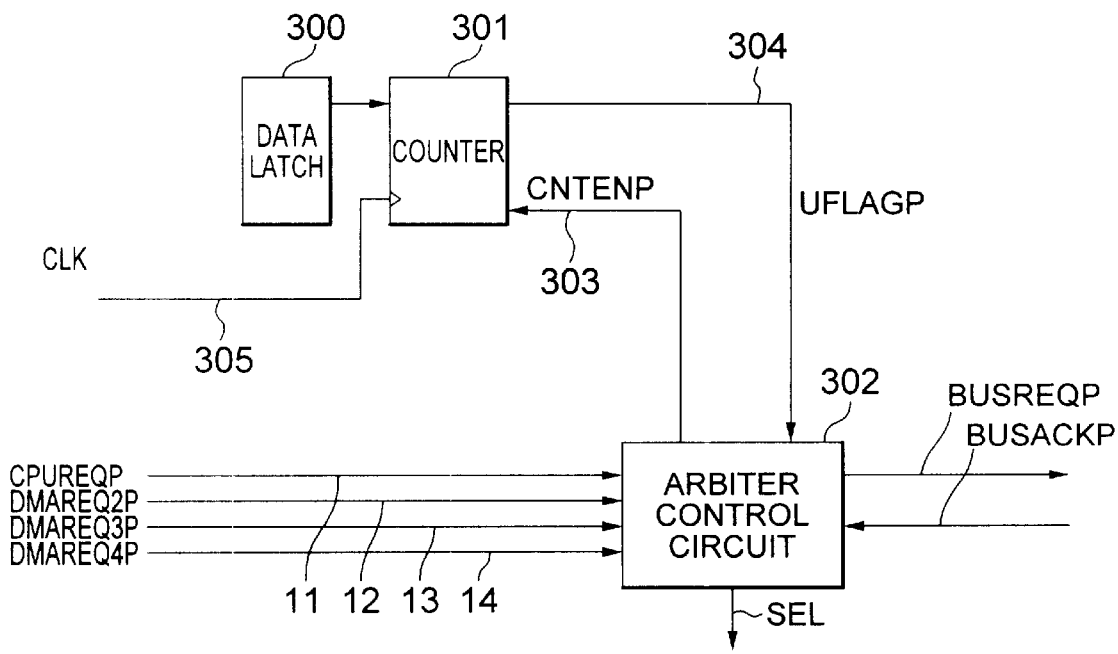
FIG. 26 is a block diagram of the bus arbiter in a sixth embodiment of the invention.
FIG. 28 illustrates two priority orders used by the arbiter control circuit in FIG. 26.

Referring to FIG. 26, the bus arbiter in the sixth embodiment comprises a data latch 300, a counter 301, and an arbiter control circuit 302. The data latch 300 stores a value received, for example, from the CPU 1. The counter 301 receives a count enable signal CNTENP from the arbiter control circuit 302 on a signal line 303. When CNTENP is asserted, the counter 301 loads the value stored in the data latch 300 and starts counting down. When the count passes zero, the counter 301 asserts an underflow flag signal UFLAGP, which is supplied to the arbiter control circuit 302 on another signal line 304, and stops counting. When CNTENP is negated, if the counter 301 is counting it stops counting, and if the counter 301 has already stopped counting due to an underflow, it negates UFLAGP. The counter 301 operates in synchronization with a clock signal CLK received on a clock signal line 305.

Figure 27:
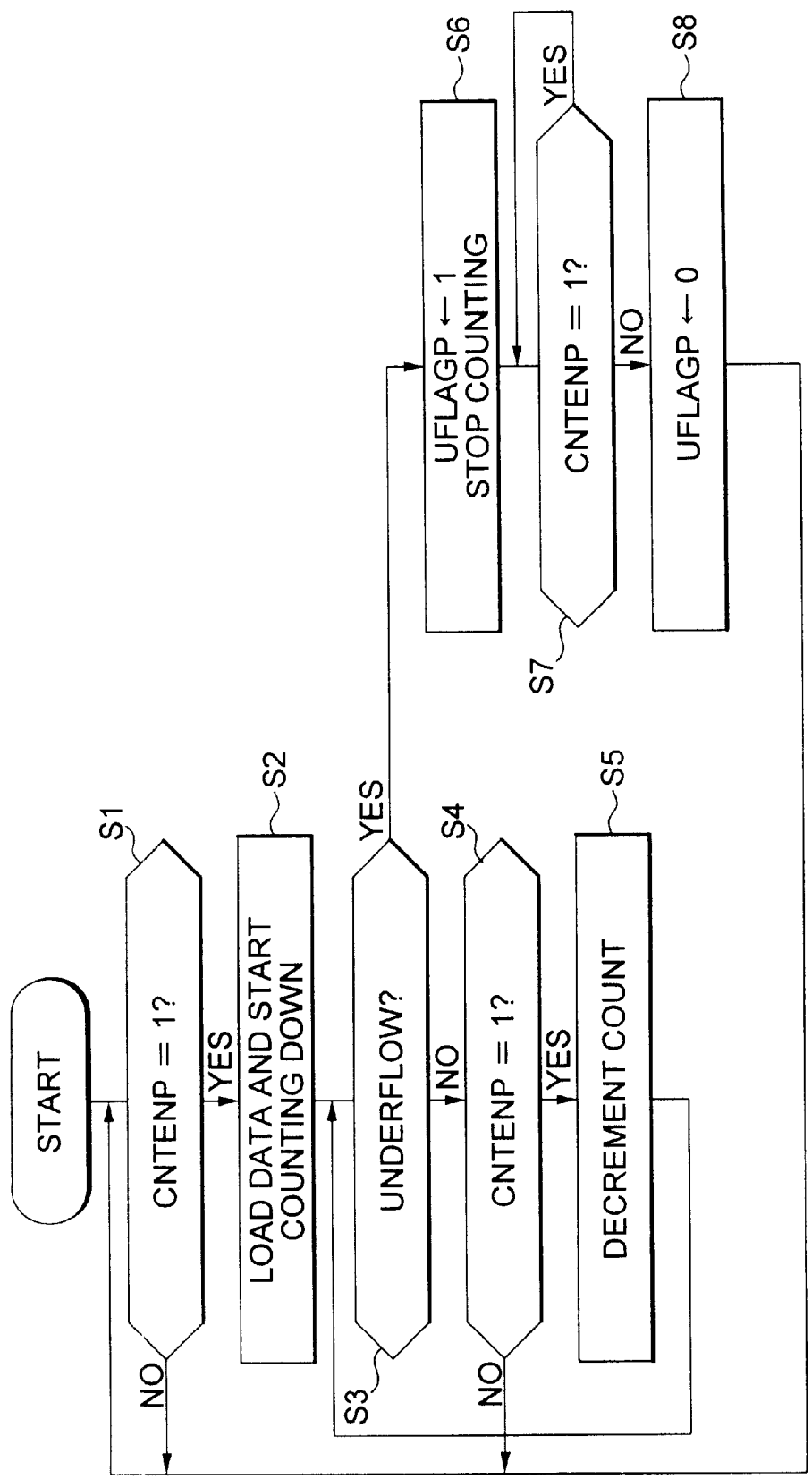
FIG. 27 is a flowchart illustrating the operation of the counter in FIG. 26.

FIG. 27 illustrates these operations in flowchart form. In step S1, the counter 301 waits for the count enable signal CNTENP to be asserted. When CNTENP is asserted, the counter 301 proceeds to load the data stored in the data latch 300 in step S2 and starts counting down from the loaded value. In step S3, the counter 301 determines whether the count has underflowed or not. If not, in step S4, the counter 301 checks the count enable signal CNTENP again. If CNTENP is still asserted, the counter 301 decrements the count by one in step S5, then returns to step S3. The loop from step S3 to step S5 is repeated until CNTENP is negated or an underflow occurs. If CNTENP is negated, the counter 301 returns to step S1 and waits for CNTENP to be asserted again. If an underflow occurs, the counter 301 sets the underflow flag UFLAGP in step S6 and stops counting. In step S7, the counter 301 waits for the arbiter control circuit 302 to negate CNTENP. When CNTENP is negated, the counter 301 clears UFLAGP to '0' in step S8, then returns to step S1 and waits for CNTENP to be reasserted.

Referring again to FIG. 26, the arbiter control circuit 302 receives the request signals CPUREQP, DMAREQ2P, DMAREQ3P, DMAREQ4P and acknowledge signal BUSACKP and generates the request signal BUSREQP and select signal SEL. These signals have the same meanings as in the preceding embodiments. In performing bus arbitration, the arbiter control circuit 302 follows different priority orders, depending on the value of the underflow flag UFLAGP. Referring to FIG. 28, when UFLAGP is '0,' DMAC 2 has the highest priority, followed in order by DMAC 3, the CPU 1, and DMAC 4. When UFLAGP is '1,' DMAC 4 has the highest priority, followed in order by DMAC 2, DMAC 3, and the CPU 1.

Figure 29:
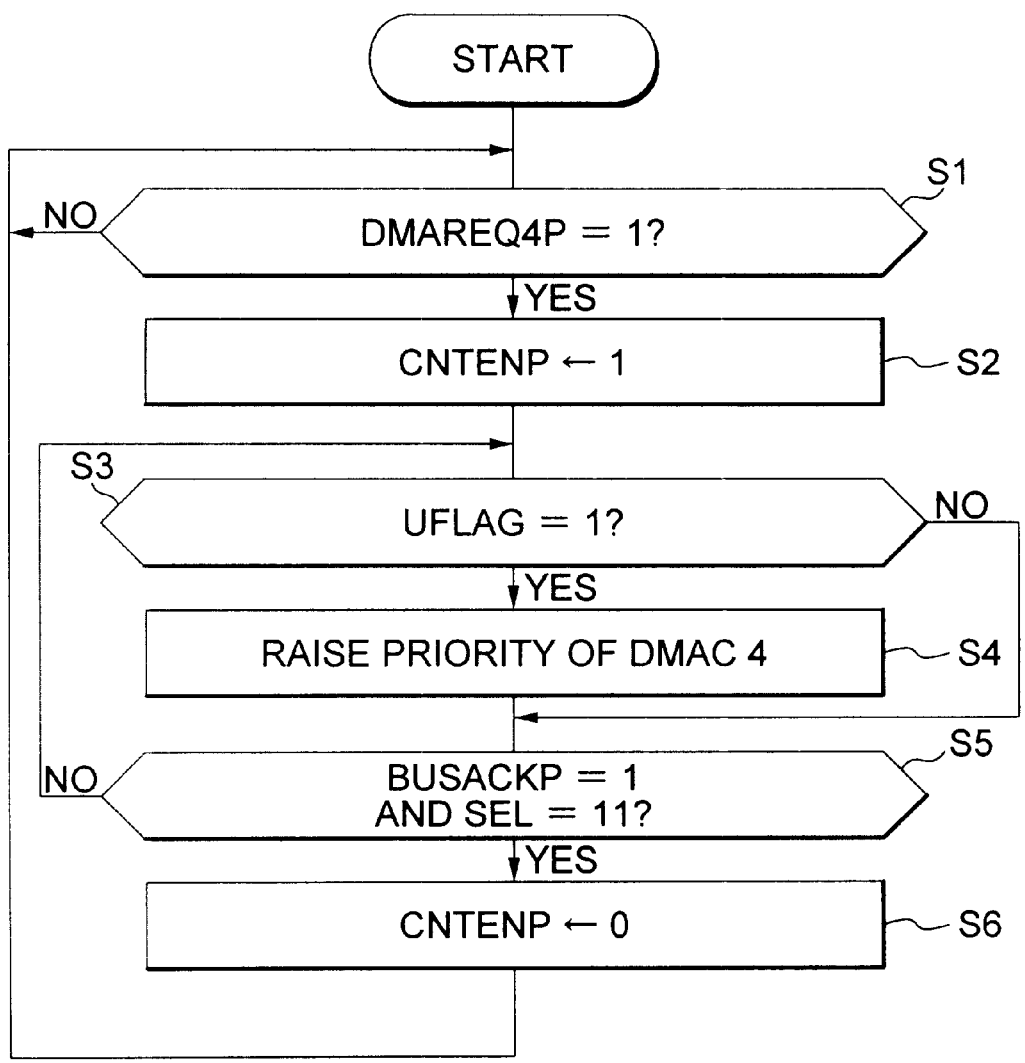
FIG. 29 is a flowchart illustrating the operation of the arbiter control circuit in FIG. 26

FIG. 29 further illustrates the operation of the arbiter control circuit 302. The operations in this flowchart are performed in parallel with other bus arbitration operations. Initially, the underflow flag UFLAGP is '0' and DMAC 4 has the lowest priority. In step S1, the arbiter control circuit 302 waits for DMAC 4 to assert request signal DMAREQ4P. When DMAREQ4P is asserted, the arbiter control circuit 302 asserts the count enable signal CNTENP in step S2. In step S3, the arbiter control circuit 302 tests the underflow flag UFLAGP. If UFLAGP is set to '1,' the arbiter control circuit 302 switches priority orders in step S4, raising the priority of DMAC 4 to the highest priority. If UFLAGP is still '0,' step S4 is skipped In step S5, the arbiter control circuit 302 determines whether the memory controller 64 has acknowledged a bus request from DMAC 4; that is, whether the acknowledge signal BUSACKP is asserted and the select signal SEL is set to '11.' If not, the arbiter control circuit 302 returns to step S3. When the acknowledgment of a bus request from DMAC 4 is recognized in step S5, the arbiter control circuit 302 negates the count enable signal CNTENP in step S6, and returns to step S1.

Figure 30:
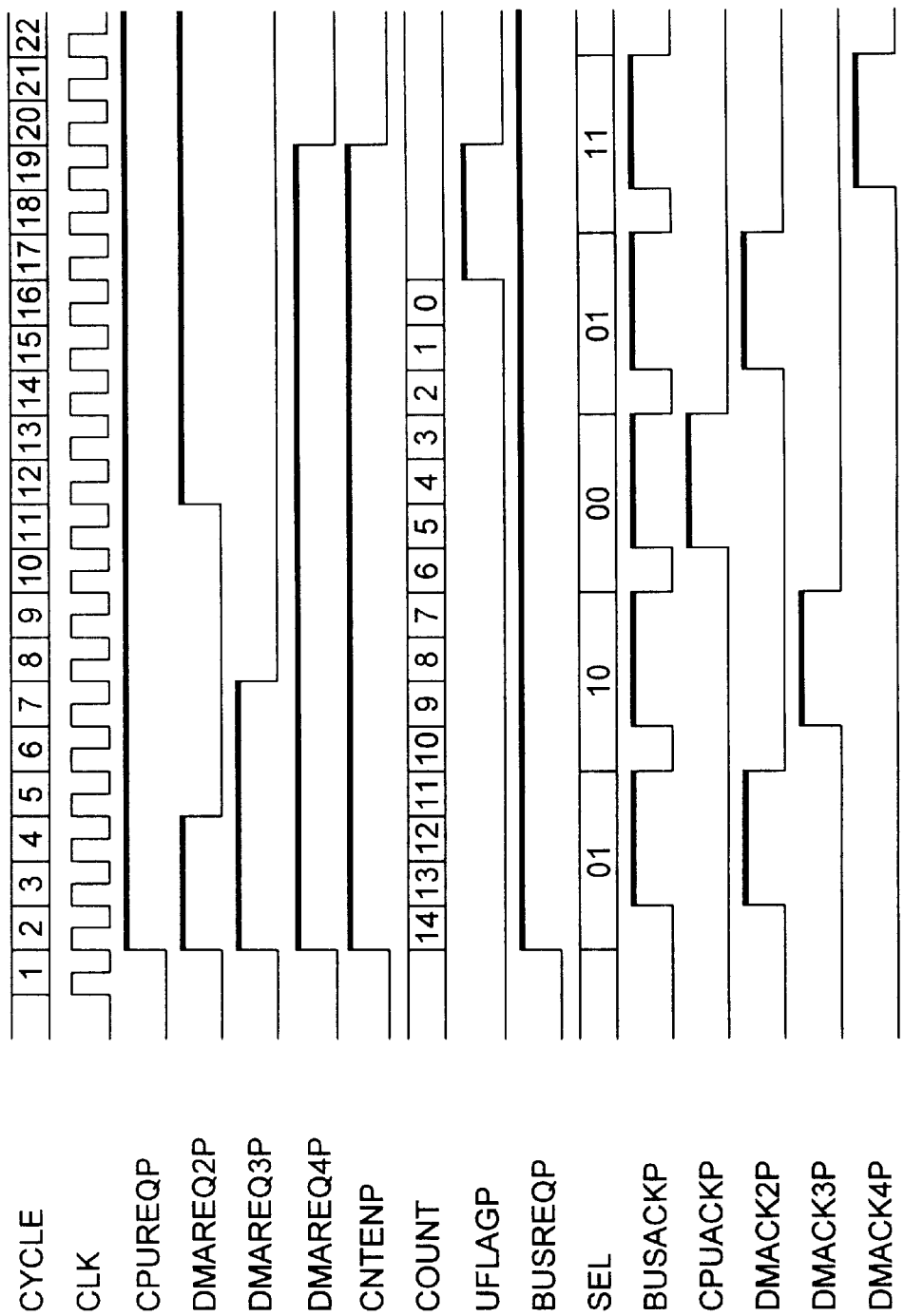
FIGS. 30 and 31 are a timing diagram illustrating the operation of the sixth embodiment.
Figure 31:
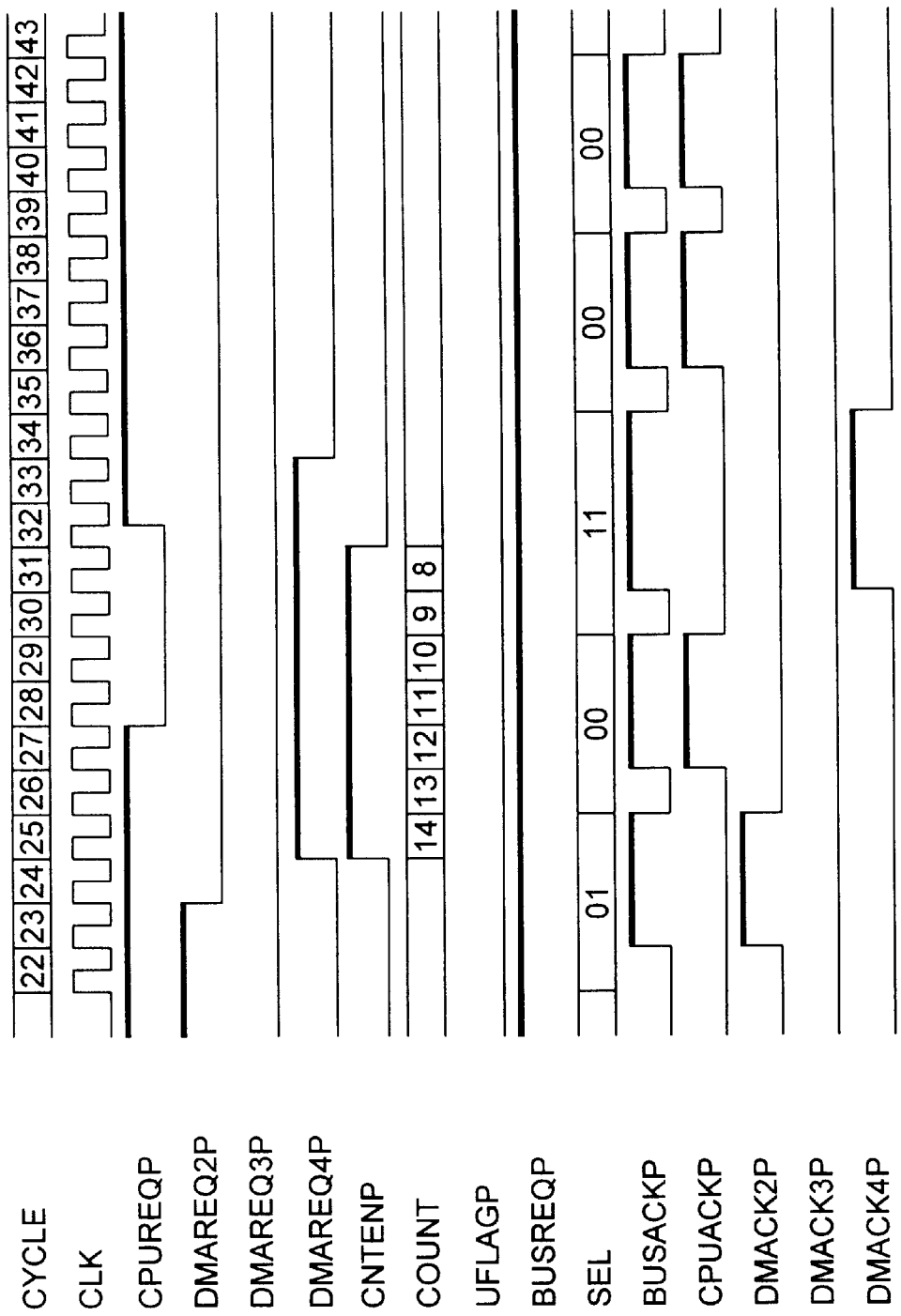

FIGS. 30 and 31 show an example of the overall operation of the sixth embodiment when the value stored in the data latch 300 is fourteen. Initially, all bus request signals and other signals are negated, the counter 301 is halted, and no bus master is using the bus.

In the second clock cycle, all four bus masters assert their bus request signals. As the underflow flag UFLAGP is negated, the arbiter control circuit 203 follows the priority order in which DMAC 2 has the highest priority and DMAC 4 has the lowest priority, and sets the select signal SEL to '01,' commanding the decoder 65 and selectors 66, 67 to select the signal lines coupled to DMAC 2. In addition, since DMAREQ4P is asserted, the arbiter control circuit 302 asserts the count enable signal CNTENP, causing the counter 301 to load the value fourteen from the data latch 300.

During the third, fourth, and fifth clock cycles, the BUSACKP and DMACK2P acknowledge signals are asserted, and the memory controller 64 carries out the memory access requested by DMAC 2, while the counter 301 begins counting down toward zero. At the end of the fourth clock cycle, DMAC 2 temporarily negates its request signal DMAREQ2P.

Bus arbitration is performed again in the sixth clock cycle, using the same priority order because UFLAGP is still '0.' The arbiter control circuit 203 now selects DMAC 3, setting SEL to '10.' In the eighth clock cycle, DMAC 3 negates its request signal DMAREQ3P. Bus arbitration is performed again in the tenth clock cycle with the same priority order, and is won by the CPU 1, so SEL is set to '00.' DMAC 2 reasserts its request signal DMAREQ2P in the twelfth clock cycle, and wins the bus arbitration in the fourteenth clock cycle, SEL being set to '01' again.

Since the third clock cycle, the arbiter control circuit 302 has also been repeating the loop from step S3 to step S5 in FIG. 29, consistently finding that the underflow flag UFLAGP is not asserted and that the continuing bus request from DMAC 4 has not been acknowledged.

In the sixteenth clock cycle, the counter 301 reaches zero. The count underflows in the seventeenth clock cycle, causing the counter 301 to stop counting and set the underflow flag UFLAGP to '1.' Detecting that UFLAGP is asserted, the arbiter control circuit 302 performs step S4 in FIG. 29 by switching to the priority order in which DMAC 4 has the highest priority. DMAC 4 therefore wins the bus arbitration in the eighteenth clock cycle, and SEL is set to '11.'

In the nineteenth clock cycle, the memory controller 64 asserts the BUSACKP acknowledge signal and begins performing the memory access requested by DMAC 4. Detecting that the memory controller 64 has acknowledged the bus request from DMAC 4 (because BUSACKP='1' and SEL='11'), the arbiter control circuit 302 negates the count enable signal CNTENP in the twentieth clock cycle. The counter 301 reacts to the negation of CNTENP by clearing the underflow flag UFLAGP to '0.' In addition, DMAC 4 negates its request signal DMAREQ4P.

Referring to FIG. 31, the next bus arbitration is performed in the twenty-second clock cycle. The active request signals are CPUREQP and DMAREQ2P. The arbitration is won by DMAC 2, which negates its request signal DMAREQ2P after recognizing that it has been granted the use of the bus.

In the twenty-fifth clock cycle, DMAC 4 asserts its request signal DMAREQ4P again. As before, the arbiter control circuit 302 asserts the count enable signal CNTENP and the counter 301 loads the value fourteen from the counter 301.

In the bus arbitration in the twenty-sixth clock cycle, the active request signals are CPUREQP and DMAREQ4P. The underflow flag UFLAGP is '0,' so the CPU 1 has higher priority, and SEL is set to '00.' Recognizing in the twenty-seventh clock cycle that it has been granted the use of the bus, the CPU 1 negates its request signal CPUREQP in the twenty-eighth clock cycle.

In the bus arbitration in the thirtieth clock cycle, only the DMAREQ4P request signal is active, and SEL is set to '11,' selecting DMAC 4. When acknowledge signal BUSACKP is asserted in the thirty-first clock cycle, the arbiter control circuit 302 recognizes that the request from DMAC 4 has been acknowledged, and in the thirty-second clock cycle, it negates the count enable signal CNTENP. The counter 301 therefore stops counting.

The CPU 1 reasserts its request signal in the thirty-second clock cycle, and DMAC 4 negates its request signal DMAREQ4P in the thirty-third clock cycle. The next two times bus arbitration is performed, in the thirty-fifth and thirty-ninth clock cycles, only the CPUREQP request signal is active, so the CPU 1 receives the use of the bus.

The sixth embodiment normally uses a fixed priority order in which DMAC 4 has the lowest priority, but it also monitors the duration of unacknowledged bus requests from DMAC 4. If the monitored interval exceeds a predetermined limit, set by the value stored in the data latch 300, the priority order is modified to give DMAC 4 the highest priority. DMAC 4 is therefore assured of being able to obtain at least a certain minimum rate of memory access, despite its normally bottom-level priority.

The value stored in the data latch 300 can be programmed, by the CPU 1, for example, to establish an optimum guaranteed minimum data transfer rate for DMAC 4, according to system requirements and load conditions.

The sixth embodiment can be modified by substituting other priority orders for the two shown in FIG. 28. For example, instead of receiving top priority at the end of a predetermined interval, DMAC 4 can merely have its priority order raised by a certain amount.

In another modification, counters are provided for two or more bus masters, and the durations of unacknowledged bus requests from each of them are monitored separately. When a duration exceeding a preset limit is detected, the priority of the corresponding bus master is raised. Minimum data transfer rates can thereby be guaranteed for a plurality of bus masters.

Next, a seventh embodiment will be described. The seventh embodiment masks bus requests from the CPU while a particular data transfer process is being carried out.

Figure 32:
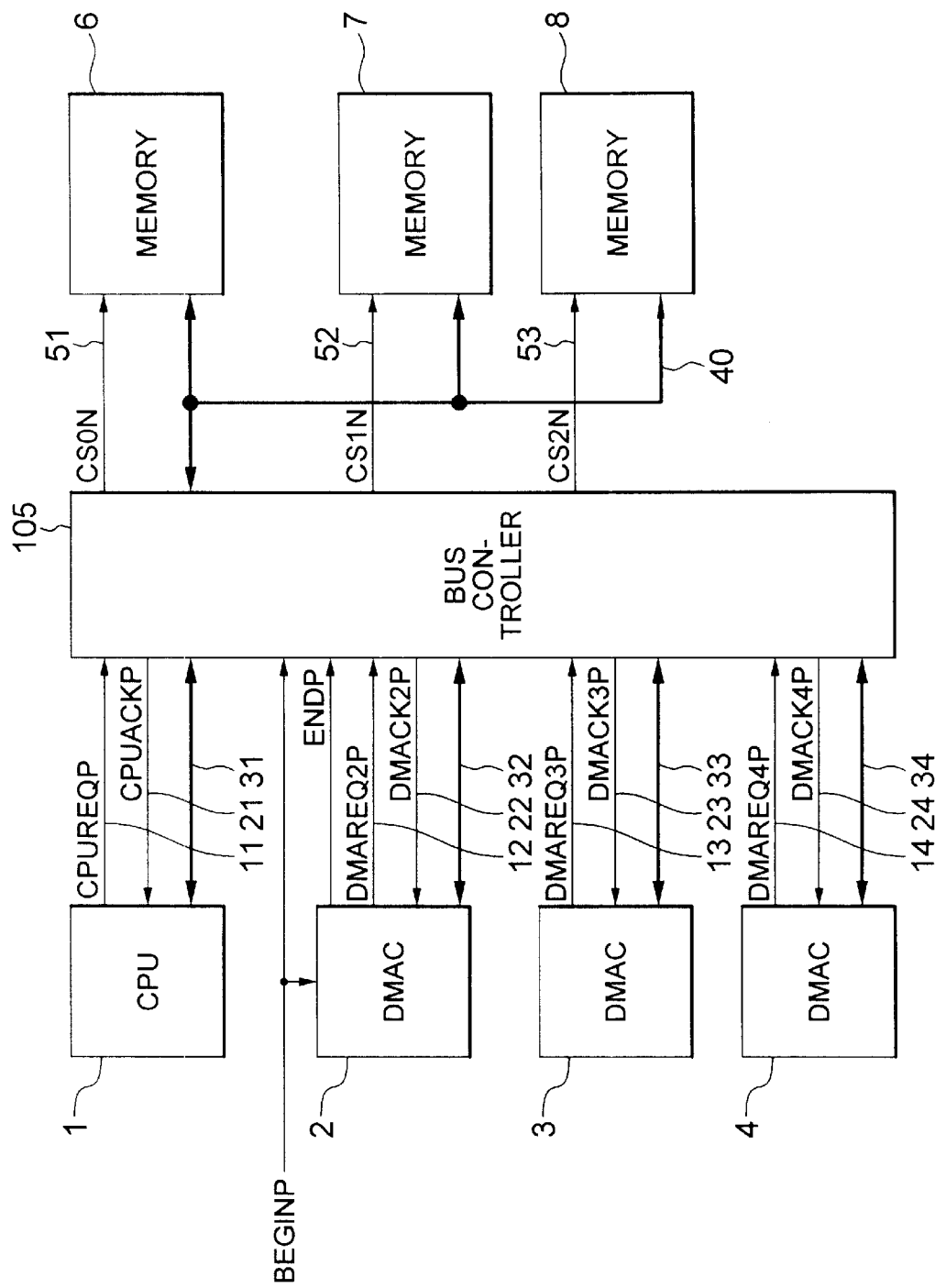
FIG. 32 is a block diagram of a bus arbitration system illustrating a seventh embodiment of the invention.

Referring to FIG. 32, in the seventh embodiment, DMAC 2 receives a signal BEGINP commanding the beginning of a predetermined data transfer process, such as the transfer of a certain amount of data at a predetermined rate. This signal BEGINP, which is generated by an address decoder not shown in the drawing, is also supplied to the bus controller 105. When the predetermined data transfer process is completed, DMAC 2 sends an end signal ENDP to the bus controller 105.

Figure 33:
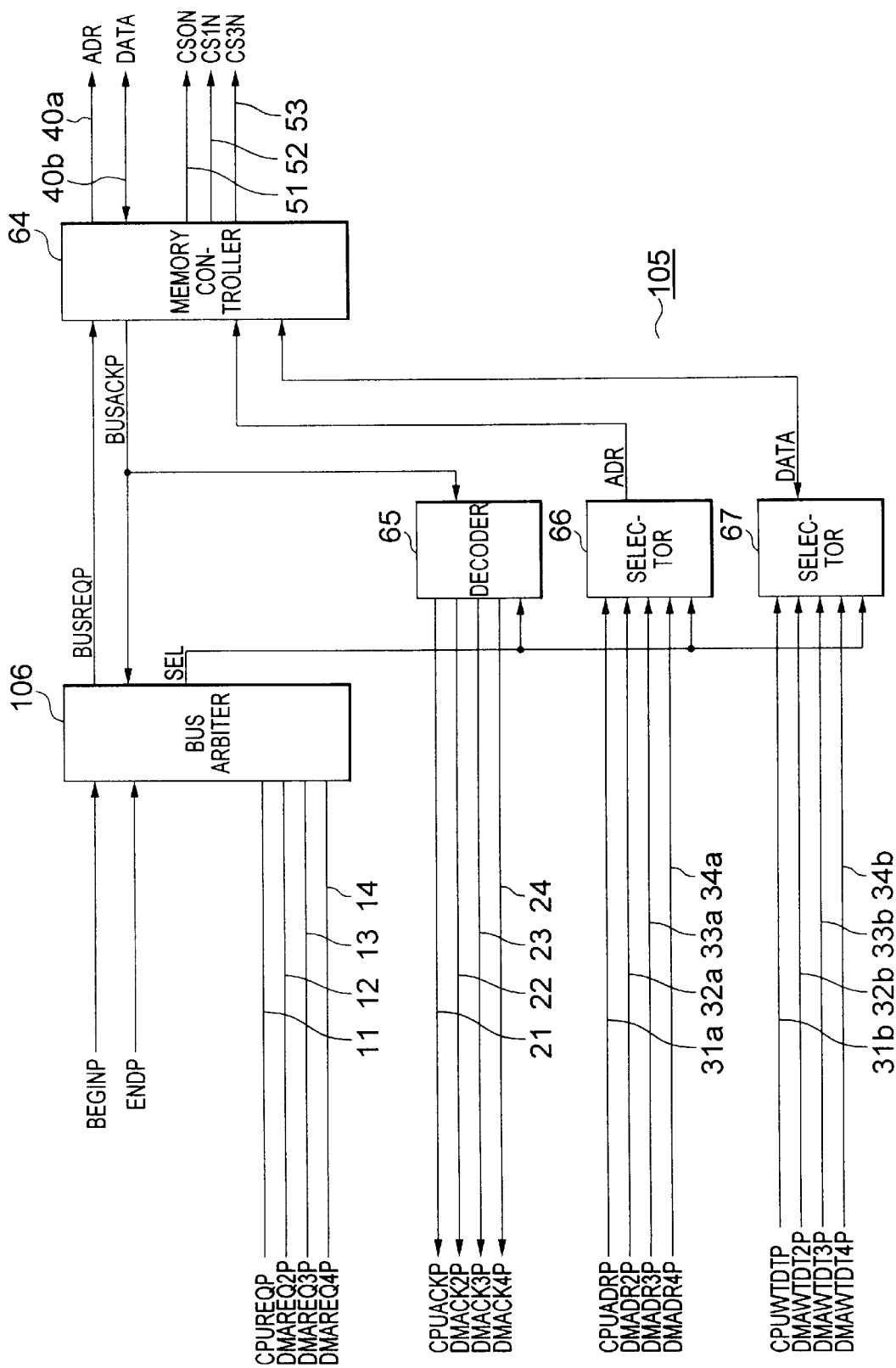
FIG. 33 is a block diagram of the bus controller in FIG. 32.

Referring to FIG. 33, the bus controller 105 comprises a memory controller 64, decoder 65, and selectors 66, 67 as described in the preceding embodiments, and a bus arbiter 106 that receives the BEGINP and ENDP signals, in addition to receiving and generating other signals described in the preceding embodiments.

Figure 34:
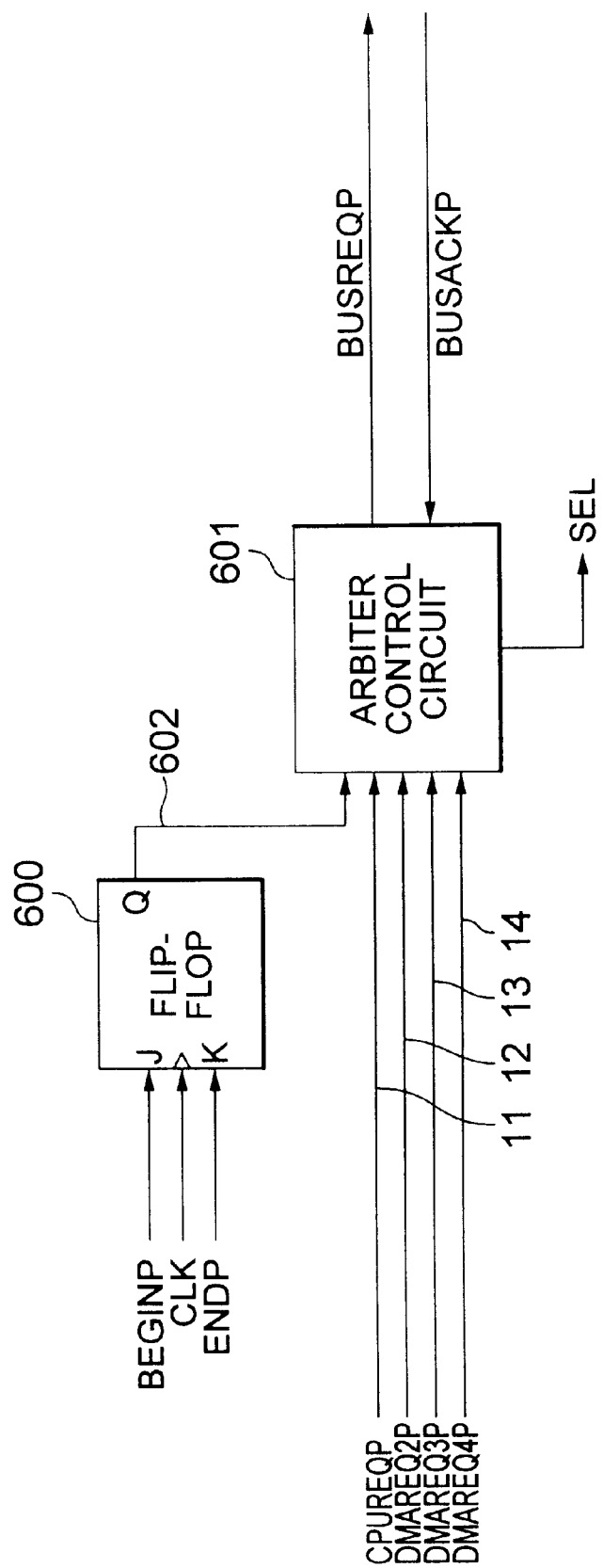
FIG. 34 is a block diagram of the bus arbiter in FIG. 33.

Referring to FIG. 34, the bus arbiter 106 comprises a JK flip-flop 600 that is set by the BEGINP signal and reset by the ENDP signal, and an arbiter control circuit 601 that receives an INTERVALP signal from the Q output terminal of the JK flip-flop 600. The arbiter control circuit 601 also receives the request signals CPUREQP, DMAREQ2P, DMAREQ3P, DMAREQ4P and acknowledge signal BUSACKP, and generates the request signal BUSREQP and select signal SEL. The arbiter control circuit 601 employs a fixed priority order in which DMAC 3 has highest priority, followed by DMAC 2, DMAC 4, and the CPU 1.

Figure 35:
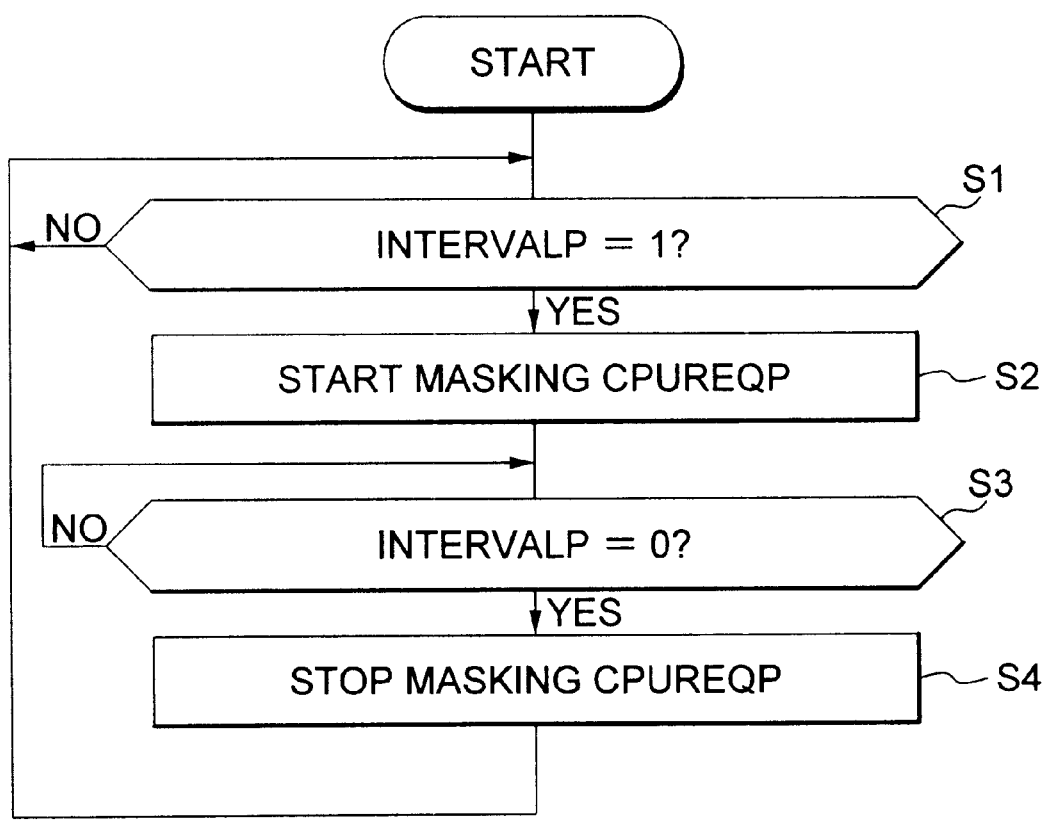
FIG. 35 is a flowchart illustrating the operation of the arbiter control circuit in FIG. 34.

FIG. 35 further illustrates the operation of the arbiter control circuit 601. The process in FIG. 35 is carried out in parallel to the normal bus arbitration process. In step S1, the arbiter control circuit 601 waits for the INTERVALP signal to be asserted. In step S2, the arbiter control circuit 601 internally masks the CPUREQP signal from the CPU 1. In step S3, the arbiter control circuit 601 waits for the INTERVALP signal to be negated. In step S4, the arbiter control circuit 601 stops masking the CPUREQP signal and returns to step S1. Thus the arbiter control circuit 601 ignores CPUREQP while INTERVALP is asserted, but recognizes CPUREQP at other times.

Figure 36:
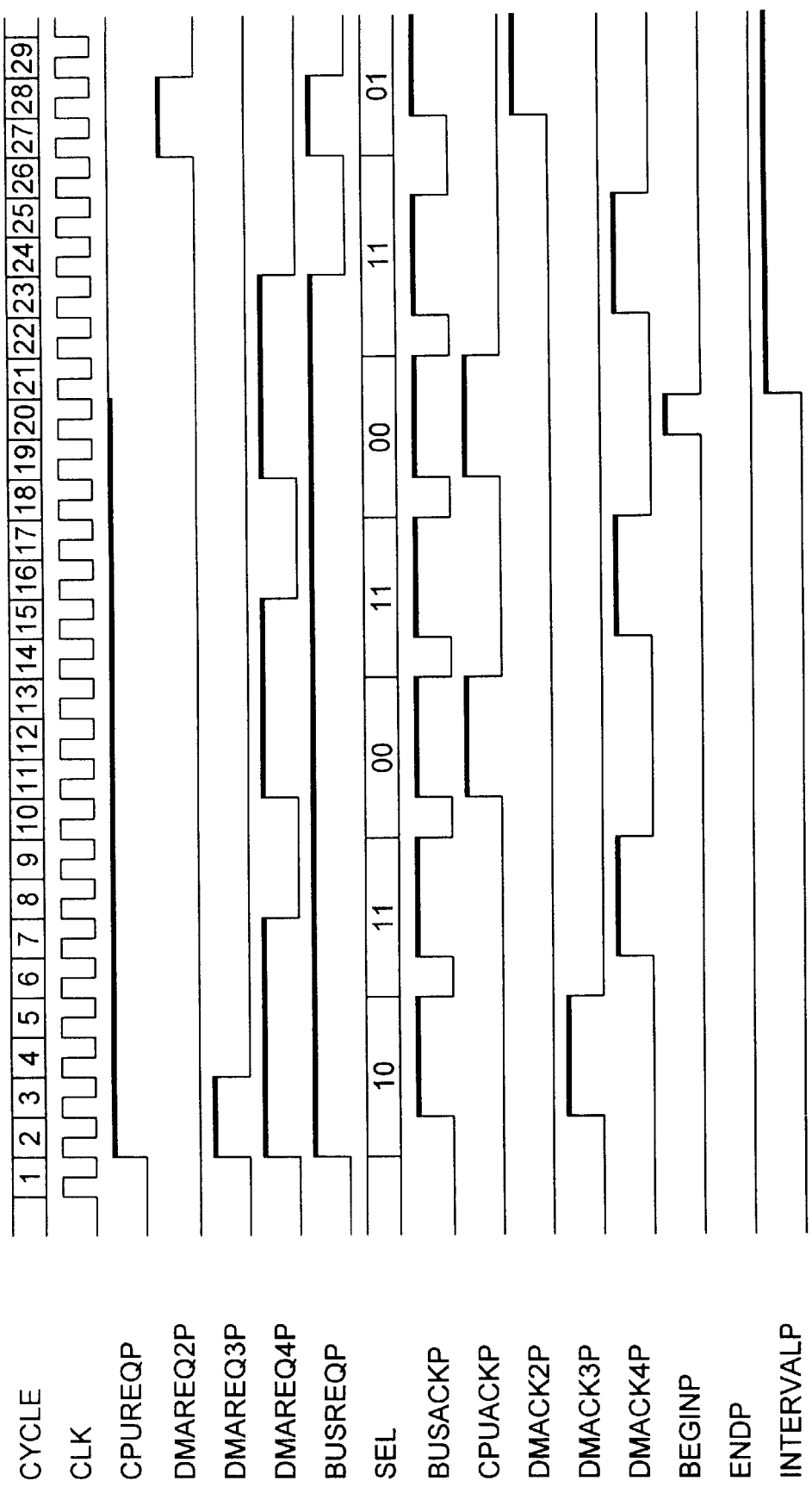
FIGS. 36 and 37 are a timing diagram illustrating the operation of the seventh embodiment.
Figure 37:
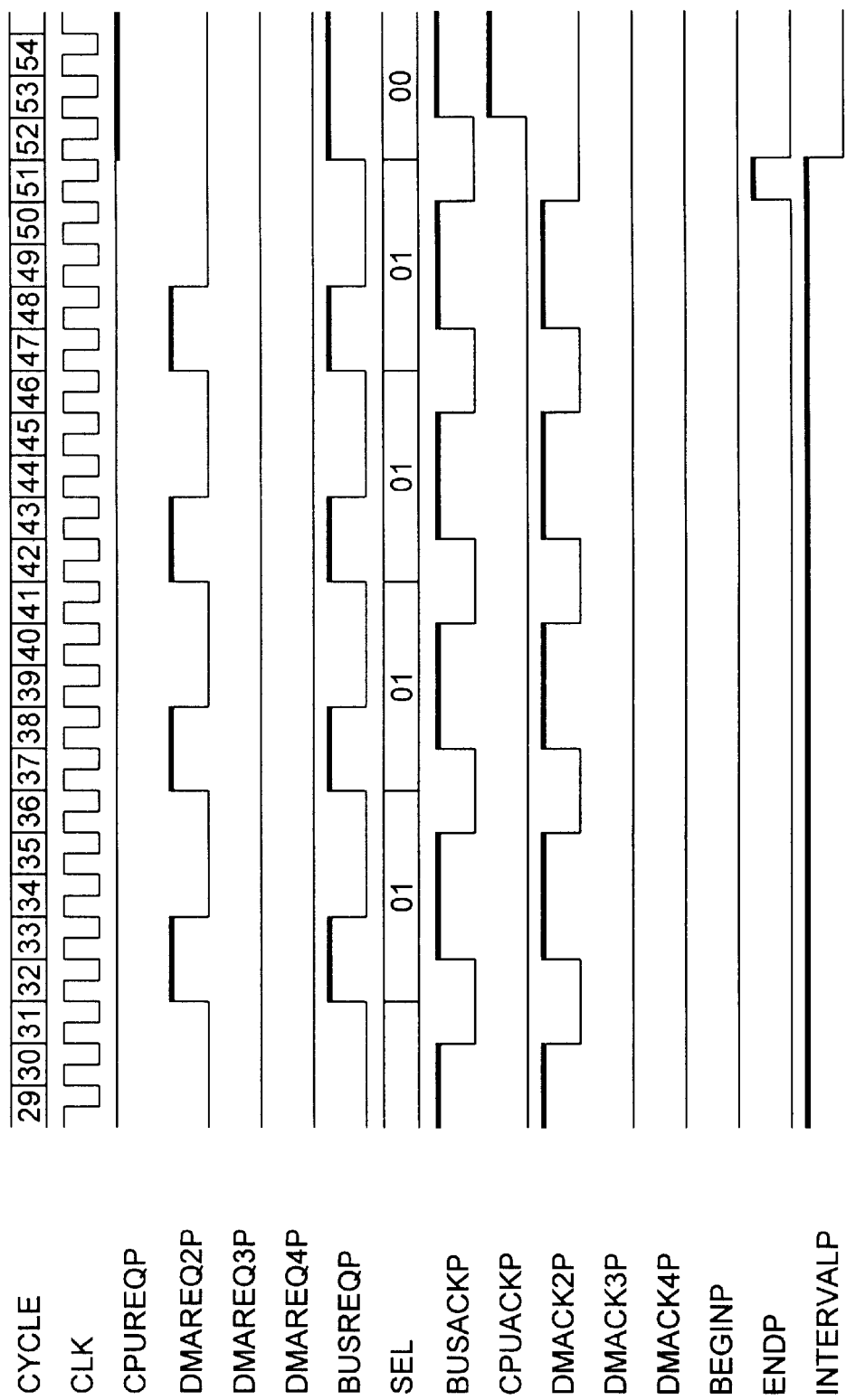

FIGS. 36 and 37 illustrate the operation of the seventh embodiment when the predetermined operation performed by DMAC 2 requires five memory accesses, preferably taking place at intervals of five clock cycles.

Initially, INTERVALP and all request signals are negated, and no bus master is using the bus. In the second clock cycle, request signals CPUREQP, DMAREQ3P, and DMAREQ4P are asserted. Following the priority order given above, the arbiter control circuit 601 grants the bus to DMAC 3 and sets the select signal SEL to '10.' In the third, fourth, and fifth memory cycles, the memory controller 64 carries out the memory access requested by DMAC 3.

Similar bus arbitration occurs in the sixth, tenth, fourteenth, and eighteenth clock cycles. The CPU 1 asserts its request signal CPUREQP constantly and wins the arbitration in the tenth and eighteenth cycles, because CPUREQP is the only request signal asserted during these two cycles.

In the twentieth clock cycle, the CPU 1 generates an address that causes the address decoder mentioned above to assert the BEGINP signal. In the twenty-first clock cycle, the INTERVALP signal output by the JK flip-flop 600 is set to '1,' and the arbiter control circuit 601 begins internal masking of the CPUREQP request signal.

In the twenty-second clock cycle, the active request signals are DMAREQ4P and CPUREQP, but CPUREQP is masked. During the next three clock cycles, the memory controller 64 carries out the memory access requested by DMAC 4.

In the twenty-fourth clock cycle, DMAC 4 negates its request signal DMAREQ4P. At this point the only active request signal is CPUREQP, which is masked. The arbiter control circuit 601 ignores CPUREQP and negates the request signal BUSREQP sent to the memory controller 64.

In the twenty-sixth clock cycle, the memory controller 64 negates the acknowledge signal BUSACKP, but since BUSREQP is still negated, bus arbitration is not carried out.

In the twenty-seventh clock cycle, DMAC 2 asserts its request signal DMAREQ2P, and the arbiter control circuit 601 asserts BUSREQP. CPUREQP remains masked, so DMAREQ2P is the only request signal recognized by the arbiter control circuit 601, and the memory controller 64 spends the next three clock cycles carrying out the first memory access requested by DMAC 2. DMAC 2 negates the DMAREQ2P request signal in the twenty-ninth clock cycle, causing the arbiter control circuit 601 to negate BUSREQP.

Referring to FIG. 37, this access pattern continues for the next twenty clock cycles. DMAREQ3P and DMAREQ4P remain inactive and CPUREQP remains masked, so DMAC 2 is able to transfer data at the desired rate by asserting DMAREQ2P at regular intervals of five clock cycles.

The memory access ending in the fiftieth clock cycle completes the operation that was begun by the BEGINP signal. In the fifty-first clock cycle, DMAC 2 asserts the ENDP signal to notify the bus controller 105 that the operation has ended. In the fifty-second clock cycle, the JK flip-flop 600 is reset and the INTERVALP signal is negated. The arbiter control circuit 601 now recognizes the CPUREQP request signal and, since all of the request signals from the DMACs are inactive, grants the use of the bus to the CPU 1. Memory access by the CPU 1 resumes in the fifty-third clock cycle.

As described above, the seventh embodiment enables a particular DMAC to transfer data without interference from the CPU 1, even if the CPU 1 constantly asserts its bus request signal. This feature is useful in transferring data between memory and various types of input-output devices (not visible) that may be coupled to the shared bus 40.

In a variation of the seventh embodiment, the bus controller 105 receives BEGINP signals pertaining to two or more different bus masters. In another variation, when the bus controller 105 receives a BEGINP signal pertaining to a particular bus master, it masks request signals from all other bus masters, instead of masking only request signals from the CPU 1. These variations also apply to the eighth embodiment, which is described next.

Figure 38:
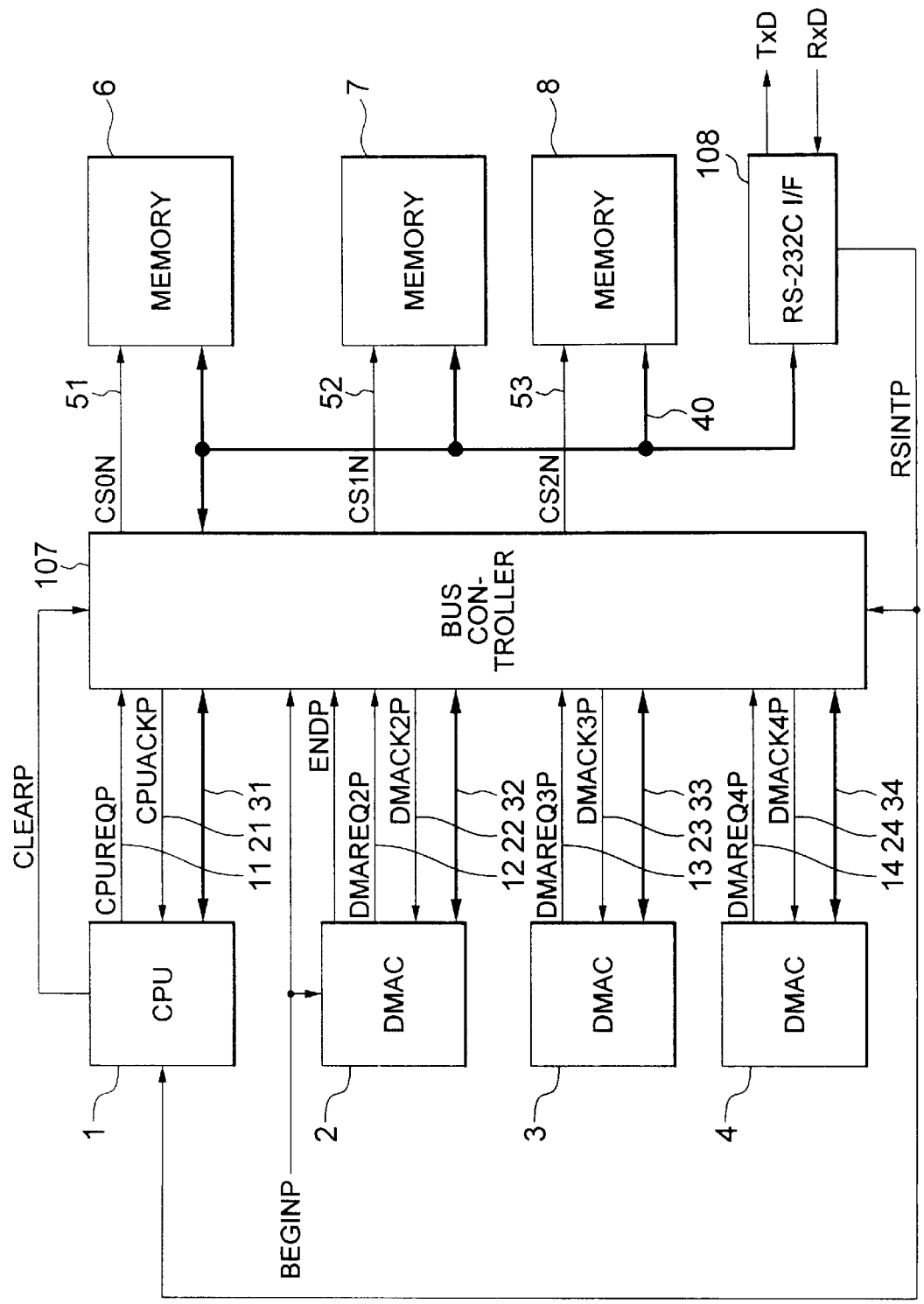
FIG. 38 is a block diagram of a bus arbitration system illustrating an eighth embodiment of the invention.

Referring to FIG. 38, in the eighth embodiment, a BEGINP signal generated by an address decoder (not visible) is supplied to the bus controller 107 and DMAC 2, and DMAC 2 supplies an ENDP signal to the bus controller 107, as in the seventh embodiment. In addition, an asynchronous serial communication interface (I/F) 108 of the well-known RS-232C type is coupled to the shared bus 40. The RS-232C interface 108 communicates through a transceiver with a host device by transmitting serial data TxD and receiving serial data RxD (the transceiver and host device are not visible). Each time the RS-232C interface 108 transmits or receives one byte of data, it notifies the CPU 1 and bus controller 107 by means of an interrupt signal RSINTP. The CPU 1 supplies a clear signal CLEARP to the bus controller 107 to clear a flag set by the RSINTP signal.

Figure 39:
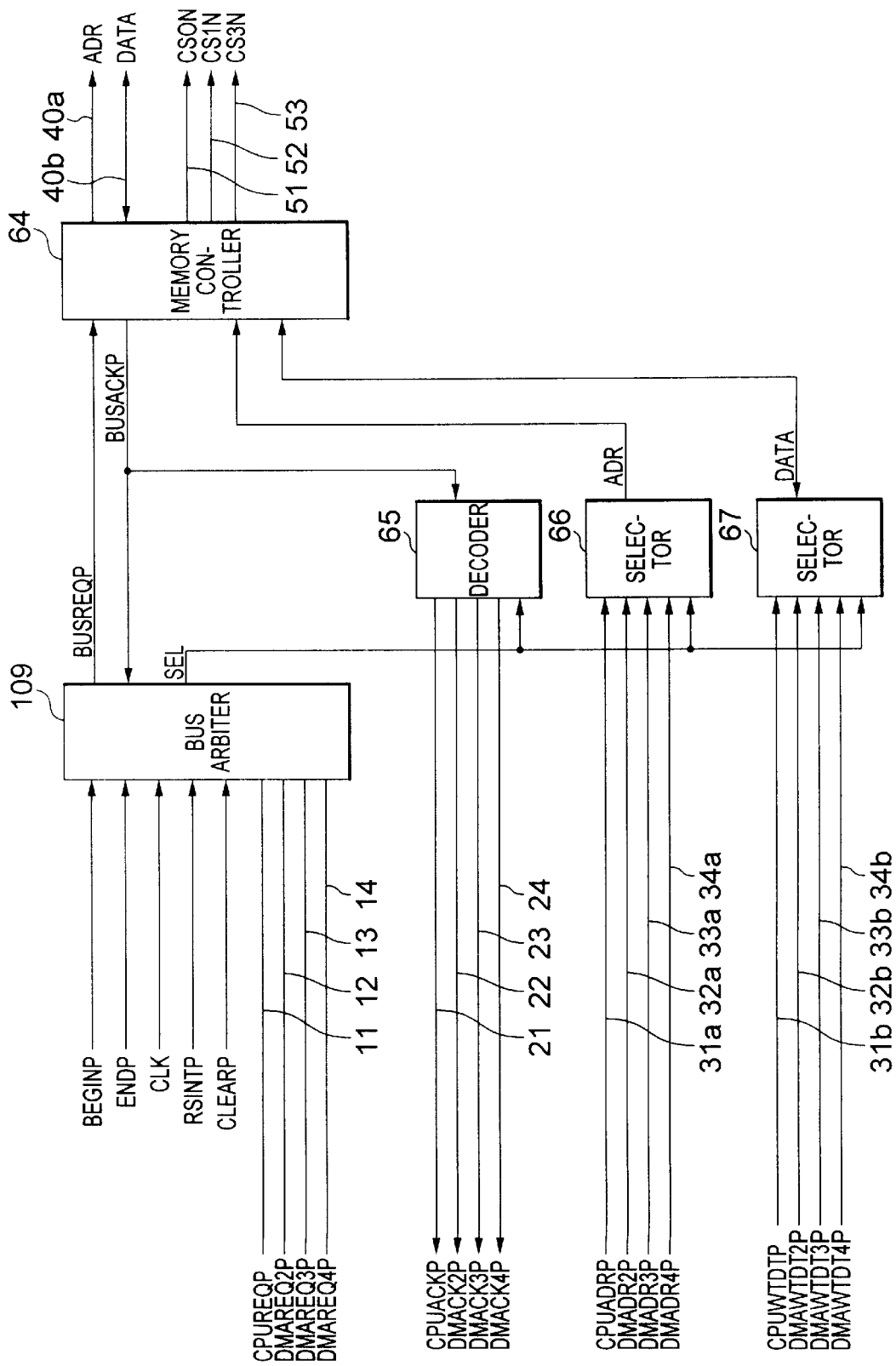
FIG. 39 is a block diagram of the bus controller in FIG. 38.

Referring to FIG. 39, the internal structure of the bus controller 107 is generally as described in the seventh embodiment, except that the bus arbiter 109 receives the interrupt signal RSINTP and clear signal CLEARP as well as the BEGINP and ENDP signals.

Figure 40:
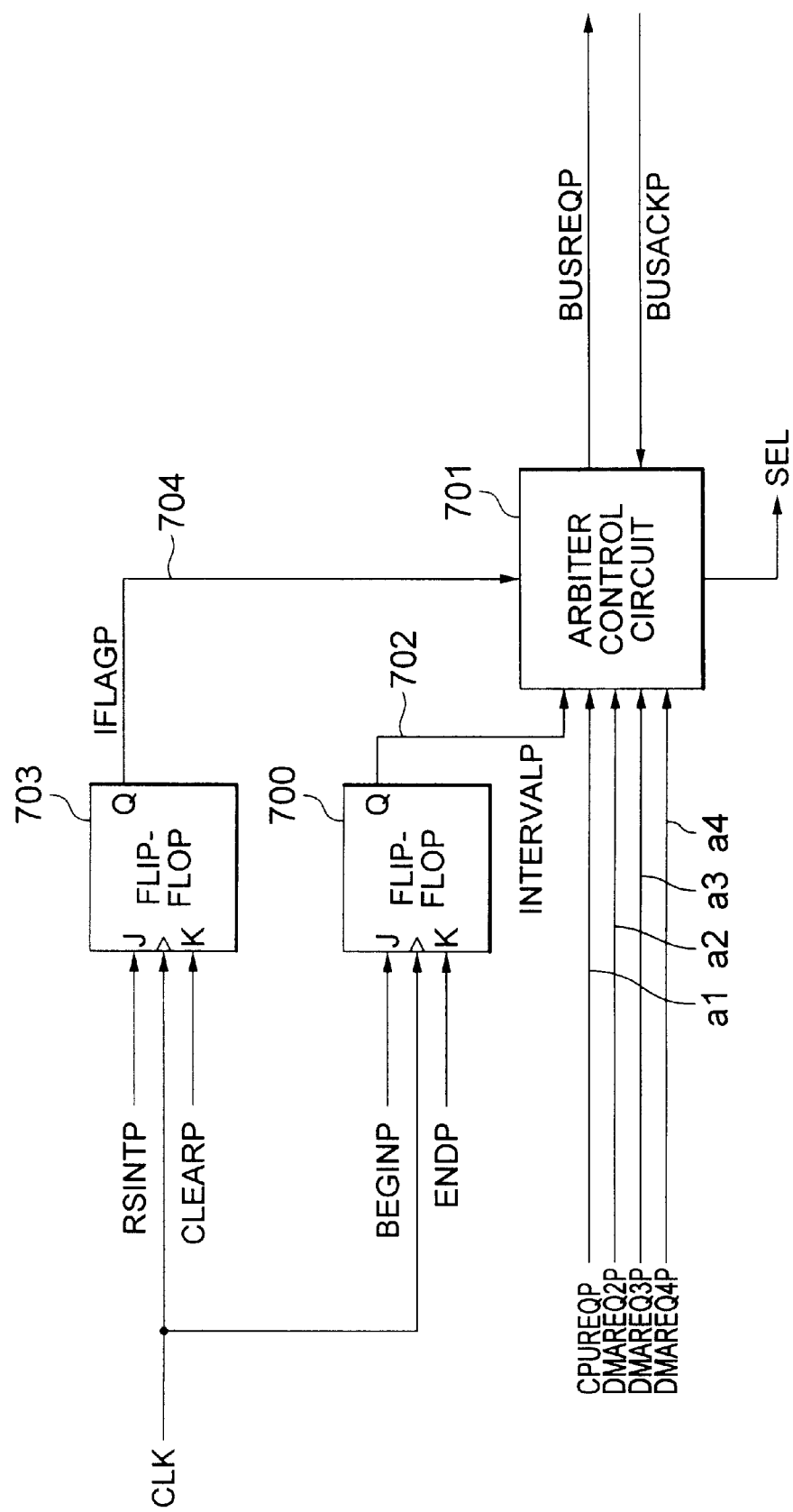
FIG. 40 is a block diagram of the bus arbiter in FIG. 39.

Referring to FIG. 40, the bus arbiter 109 comprises a pair of JK flip-flops 700, 703 and an arbiter control circuit 701. JK flip-flop 700 is set by the BEGINP signal and reset by the ENDP signal, and sends an INTERVALP signal from its Q output terminal to the arbiter control circuit 701 on a signal line 702. JK flip-flop 703 is set by the interrupt signal RSINTP and cleared by the clear signal CLEARP, and sends an interrupt flag signal IFLAGP from its Q output terminal to the arbiter control circuit 701 on another signal line 704.

Figure 41:
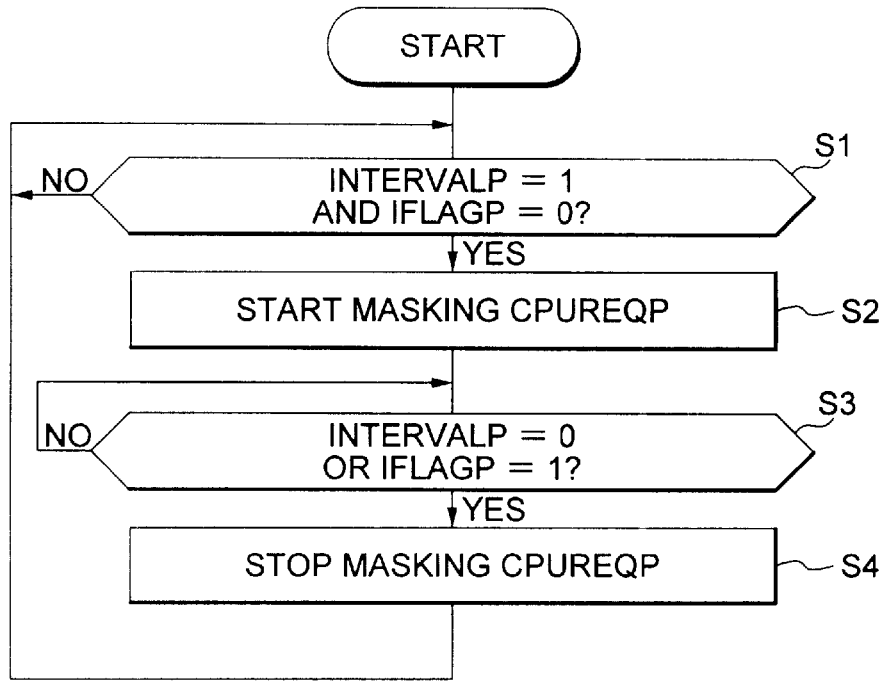
FIG. 41 is a flowchart illustrating the operation of the arbiter control circuit in FIG. 40.

The arbiter control circuit 701 operates as described in the seventh embodiment, except that it masks the request signal CPUREQP from the CPU 1 only when the interval signal INTERVALP is asserted and the interrupt flag IFLAGP is negated. Accordingly, the arbiter control circuit 701 follows the flowchart in FIG. 41. In step S1, it checks whether INTERVALP is asserted and IFLAGP is negated and waits for this condition to be true. In step S2, it begins internal masking of the request signal CPUREQP from the CPU 1. In step S3, it checks whether INTERVALP is negated or IFLAGP is asserted, and waits for either of these conditions to be true. In step S4, it stops masking the CPUREQP request signal.

Figure 42:
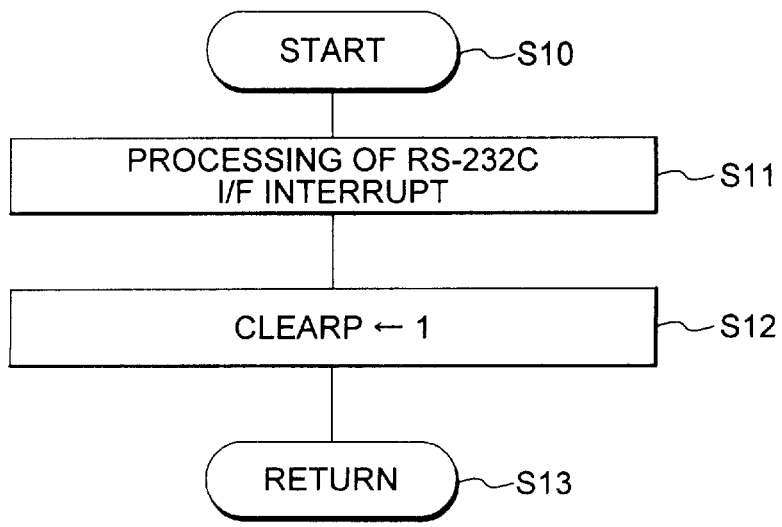
FIG. 42 is a flowchart illustrating interrupt processing in the eighth embodiment.

FIG. 42 illustrates the operation of the CPU 1 in processing an interrupt from the RS-232C interface 108. The operation starts in step S10 when the RSINTP signal is asserted. Interrupt processing is carried out in step S11 by an interrupt-handling program that, for example, reads a byte of data from the RS-232C interface 108 and stores the data in one of the memory devices 6, 7, 8. In step S12, the interrupt-handling program ends by asserting the clear signal CLEARP for one clock cycle. In step S13, the CPU 1 returns to normal processing.

Figure 43:
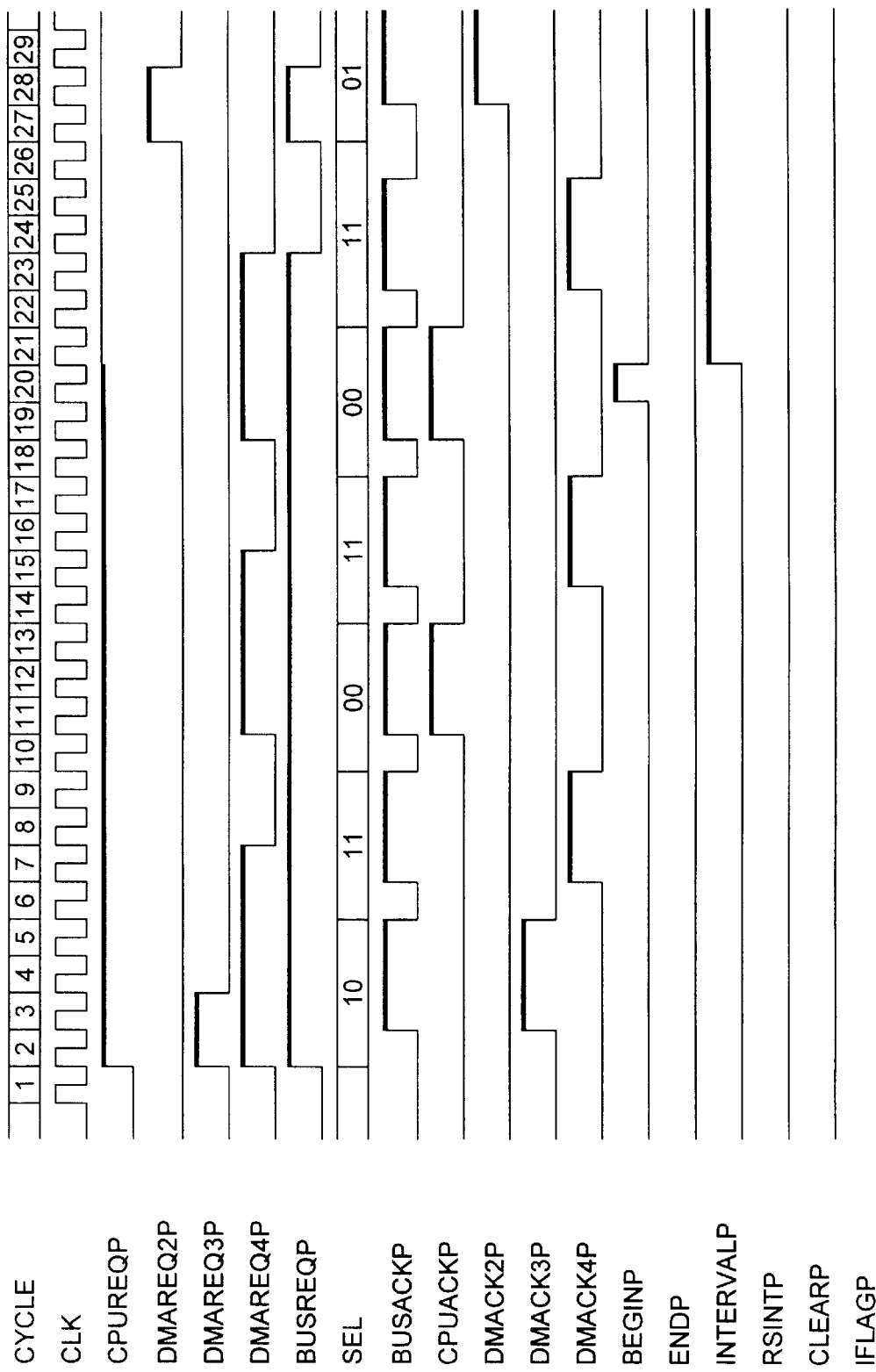
FIGS. 43 and 44 are a timing diagram illustrating the operation of the eighth embodiment.
Figure 44:
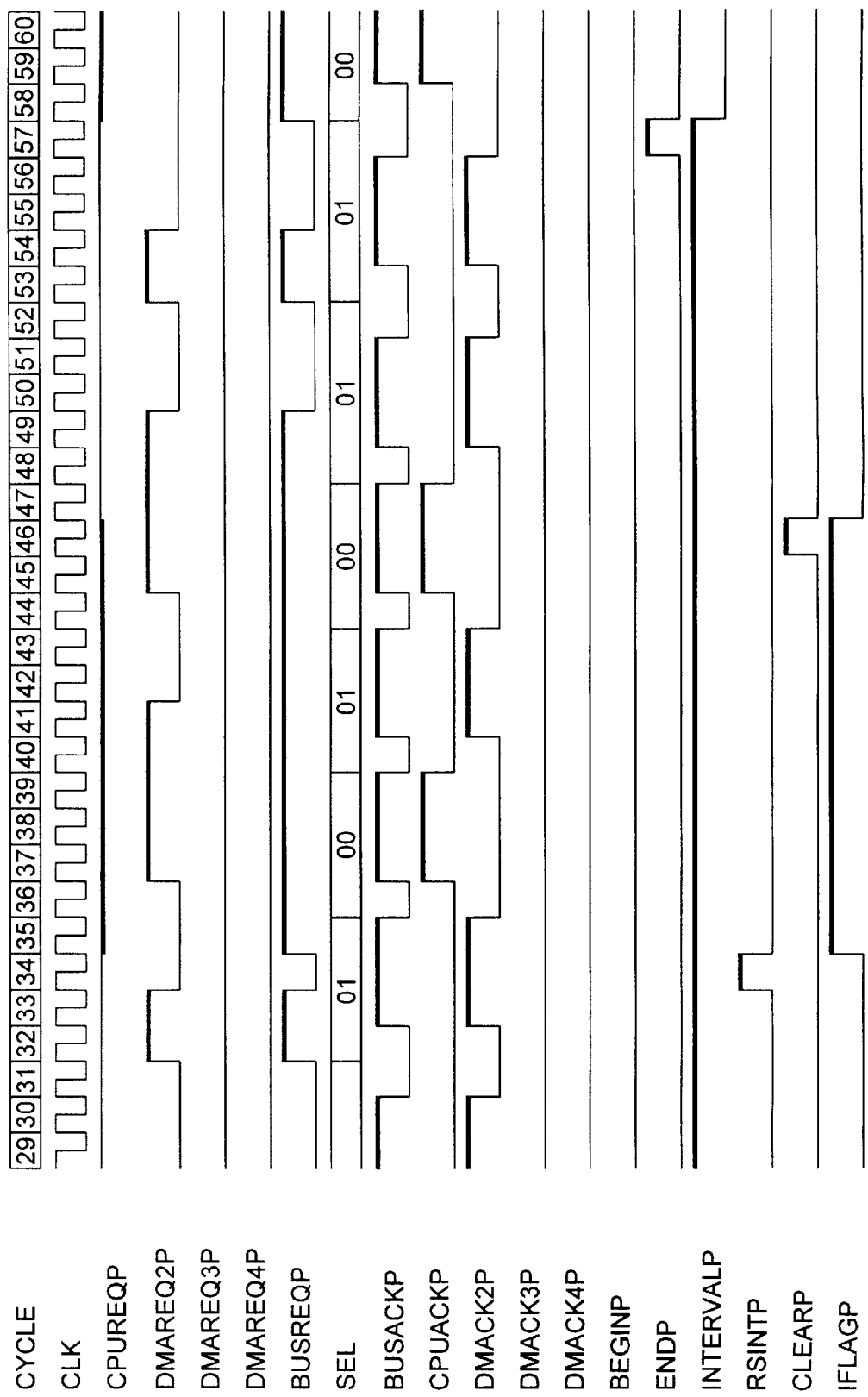

FIGS. 43 and 44 illustrate the operation of the eighth embodiment. The operation depicted is similar to the operation described in the seventh embodiment, shown in FIGS. 36 and 37, except that the RS-232C interface 108 generates an interrupt while DMAC 2 is transferring data.

Initially, INTERVALP and all request signals are negated, no bus master is using the bus, and the interrupt signal RSINTP and interrupt flag IFLAGP are inactive. RSINTP and IFLAGP remain inactive during the operations shown in FIG. 43, which are identical to the operations described in FIG. 36 in the seventh embodiment. In the twentieth clock cycle, an address decoder (not shown in the drawings) asserts the BEGINP signal. In the twenty-first clock cycle, JK flip-flop 700 is set and the INTERVALP signal is asserted. Since INTERVALP is asserted and IFLAGP is negated, the arbiter control circuit 701 begins internal masking of the CPUREQP request signal Referring to FIG. 44, in the thirty-fourth clock cycle, while the second memory access requested by DMAC 2 is being carried out, the RS-232C interface 108 asserts the RSINTP interrupt signal. In the thirty-fifth clock cycle, JK flip-flop 703 is set and the interval signal INTERVALP is asserted, causing the arbiter control circuit 701 to stop masking the CPUREQP request signal. Consequently, bus arbitration is performed in the thirty-sixth clock cycle, when only the CPUREQP request signal is asserted. During the next three clock cycles, the memory controller 64 carries out an operation requested by the CPU's interrupt-handling program, e.g., the transfer of a byte of data from the RS232C interface 108 to the CPU 1.

In the bus arbitration performed in the fortieth clock cycle, both CPUREQP and DMAREQ2P are asserted. The arbitration is won by DMAC 2, which has higher priority, and the third memory access requested by DMAC 2 is carried out.

In the bus arbitration performed in the forty-fourth clock cycle, only CPUREQP is asserted. During the next three clock cycles, the memory controller 64 carries out another operation requested by the CPU's interrupt-handling program, e.g., writing data from the CPU 1 into one of the memory devices 6, 7, 8.

During this access operation, in the forty-sixth clock cycle, the CPU 1 executes an instruction that asserts the CLEARP signal. In the forty-seventh clock cycle, JK flip-flop 703 is reset, negating the interrupt flag IFLAGP. Detecting once more that INTERVALP is asserted and IFLAGP is negated, the arbiter control circuit 701 resumes masking of the CPUREQP request signal. Bus arbitration is carried out in the forty-eighth clock cycle, but only the DMAREQ2P signal is recognized, so the fourth memory access requested by DMAC 2 is carried out.

The next bus arbitration occurs in the fifty-third clock cycle. DMAREQ2P is again the only recognized request signal, so the fifth memory access requested by the DMAC 2 is carried out, completing the operation begun by the BEGINP signal.

In the fifty-seventh clock cycle, DMAC 2 asserts the ENDP signal to notify the bus controller 107 that the operation has ended. In the fifty-eighth clock cycle, JK flip-flop 700 is reset and the INTERVALP signal is negated, causing the arbiter control circuit 601 to resume recognition of the CPUREQP request signal. Bus arbitration is carried out in this clock cycle, and access by the CPU 1 resumes in the fifty-ninth clock cycle.

The eighth embodiment provides a flexible bus control scheme in which normal bus access by the CPU 1 is masked while DMAC 2 is performing a special operation involving, for example, the transfer of data at a certain preferred rate, but the masking is suspended while the CPU 1 is processing an interrupt from the RS-232C interface 108. If no such interrupt occurs, the same advantage of a nondisrupted data transfer is obtained as in the seventh embodiment. If an interrupt occurs, however, prompt interrupt service can be provided, even if the data transfer by DMAC 2 is already in progress.

The interrupt source that suspends the masking of the CPUREQP request signal is not limited to an RS-232C interface. A similar masking-suspension function can be provided for any interrupt source requiring prompt service.

The seventh and eighth embodiments are not limited to the use of JK flip-flops. Other types of indicator circuits can be used.

Several variations of the above embodiments have already been described, but those skilled in the art will recognize that further variations are possible within the scope claimed below.

What is claimed is:

1. A bus arbitration system in which a plurality of bus masters request use of a shared bus by sending request signals to a bus controller, the bus controller comprising:

a request signal masking unit masking the request signals sent from one of said bus masters to said bus controller for an interval of predetermined length after said bus controller has granted the use of said shared bus to said one of said bus masters and said one of said bus masters has finished using said shared bus.

2. The bus arbitration system of claim 1, wherein the length of said interval is programmable.

3. The bus arbitration system of claim 1, wherein said plurality of bus masters includes a central processing unit and at least one bus master other than said central processing unit, and the bus controller has a separate request signal masking unit for masking the request signals sent from each said at least one bus master other than said central processing unit.

4. The bus arbitration system of claim 3, wherein the length of said interval is separately programmable in each said request signal masking unit.

5. The bus arbitration system of claim 4, wherein each said request signal masking unit includes a counter that is loaded with a value indicating the programmed length of said interval and is decremented in synchronization with a clock signal, starting when said one of said bus masters has finished using said shared bus.

6. The bus arbitration system of claim 5, wherein said request signals are masked while said counter is being decremented, and are unmasked when said counter has been decremented a preset number of times.

7. The bus arbitration system of claim 6, wherein said counter is reloaded after said request signals are unmasked.

8. The bus arbitration system of claim 3, wherein at least one said bus master other than said central processing unit is a direct memory access controller.

9. A method of performing bus arbitration in a system in which a plurality of bus masters request use of a shared bus, comprising the steps of:

recognizing a request from one of said bus masters;

granting the use of said shared bus to said one of said bus masters; and masking further requests from said one of said bus masses for an interval of predetermined length after said one of said bus masters has finished using said shared bus.

10. The method of claim 9, wherein the length of said interval is programmable.

11. The method of claim 9, wherein said plurality of bus masters includes a central processing unit and at least one bus master other than said central processing unit, and the step of masking further requests is carried out separately for each said at least one bus master other than said central processing unit.

12. The method of claim 11, wherein the length of said interval is separately programmable for each said at least one bus master other than said central processing unit.

13. The method of claim 12, wherein said step of masking further requests further comprises the steps of:

loading a value indicating the programmed length of said interval into a counter; and decrementing said counter in synchronization with a clock signal, starting when said one of said bus masters has finished using said shared bus.

14. The method of claim 13, wherein said request signals are masked while said counter is being decremented, and are unmasked when said counter has been decremented a preset number of times.

15. The method of claim 14, further comprising the step of reloading said counter after said request signals are unmasked.

16. The method of claim 11, wherein at least one said bus master other than said central processing unit is a direct memory access controller.

* * * * *